US007138083B2

(12) United States Patent
Horibe

(10) Patent No.: US 7,138,083 B2

(45) Date of Patent: Nov. 21, 2006

(54) METHOD OF PRODUCING ARC TUBE BODY

(75) Inventor: Yasutaka Horibe, Ikoma (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 570 days.

(21) Appl. No.: 10/240,874

(22) PCT Filed: Jan. 31, 2002

(86) PCT No.: PCT/JP02/00806

§ 371 (c)(1), (2), (4) Date: Oct. 3, 2002

(87) PCT Pub. No.: WO02/065501

PCT Pub. Date: Aug. 22, 2002

(65) Prior Publication Data

US 2003/0116892 A1 Jun. 26, 2003

(30) Foreign Application Priority Data

Feb. 9, 2001 (JP) .............................. 2001-33444
Mar. 6, 2001 (JP) .............................. 2001-61324
Nov. 27, 2001 (JP) ............................ 2001-361373

(51) Int. Cl.
*C04B 33/32* (2006.01)
*H01J 9/02* (2006.01)

(52) U.S. Cl. ...................... 264/635; 264/635; 264/317

(58) Field of Classification Search ............ 264/328.8, 264/325, 510, 512, 1.1, 1.21; 445/23, 26, 445/29, 38, 40; 228/101, 121
See application file for complete search history.

(56) References Cited

U.S. PATENT DOCUMENTS 5,993,725 A * 11/1999 Zuk et al. .................. 264/635
5,994,839 A 11/1999 Yamamoto et al.
6,120,713 A 9/2000 Cuisin et al.
6,137,229 A 10/2000 Nishiura et al.

FOREIGN PATENT DOCUMENTS

| | | | |
|---|---|---|---|
| JP | 48-61514 | | 8/1973 |
| JP | 50014171 A | * | 2/1975 |
| JP | 57-201614 A | * | 10/1982 |
| JP | 2-274504 | | 11/1990 |
| JP | 4-305334 | | 10/1992 |
| JP | 7-47518 | | 2/1995 |
| JP | 8-300323 | | 11/1996 |
| JP | 8-301666 | | 11/1996 |
| JP | 9-11285 | | 1/1997 |
| JP | 10-106491 | | 4/1998 |
| JP | 10106491 A | * | 4/1998 |
| JP | 10-278015 | | 10/1998 |
| JP | 10-323813 | | 12/1998 |

(Continued)

*Primary Examiner*—Carlos Lopez
(74) *Attorney, Agent, or Firm*—Hamre, Schumann, Mueller & Larson, P.C.

(57) ABSTRACT

To form an arc tube body including a main tube portion to be a discharge space and thin tube portions for accommodating electrodes, a core (6) is disposed in a hollow space formed by a pair of arc tube body formation molds (7) and (8) and thereafter, a slurry (12) is injected into a space between the molds (7), (8) and the core (6). In the core (6), portions for forming the internal shape of the thin tube portions of the arc tube body are provided with a shaft (3).

8 Claims, 35 Drawing Sheets

FOREIGN PATENT DOCUMENTS

| | | |
|---|---|---|
| JP | 11-42619 | 2/1999 |
| JP | EP 0 905 744 | 3/1999 |
| JP | 11-162416 | 6/1999 |
| JP | 11-204086 | 7/1999 |
| JP | 11-329353 | 11/1999 |
| WO | WO 0250857 A2 * | 6/2002 |

* cited by examiner

METHOD OF PRODUCING ARC TUBE BODY

TECHNICAL FIELD

The present invention relates to an arc tube body. In particular, the present invention relates to a method for manufacturing an arc tube body formed of a ceramic material and to a core used in the method.

BACKGROUND ART

Metal halide lamps have been known as metal vapor discharge lamps to which reasonable mercury lamp ballasts are applicable. In general, a quartz arc tube body mainly is used in the metal vapor discharge lamps. However, in recent years, a ceramic arc tube body also is used to increase the heat resistance of the metal vapor discharge lamps.

FIGS. 33A and 33B are cross-sectional views, each showing one example of a conventional arc tube body formed of a ceramic material. FIG. 33A shows a conventional arc tube body including a cylindrical main tube portion 101, thin tube portions 102*a* and 102*b* for accommodating a pair of main electrodes, and ring-shaped members 103 for fixing the thin tube portions 102*a* and 102*b* to the main tube portion 101 (see JP 11(1999)-162416 A). On the other hand, FIG. 33B shows a conventional arc tube body including a thin tube portion 102*c* for accommodating an auxiliary electrode in addition to the same components as those in the arc tube body shown in FIG. 33A (see JP 10(1998)-106491 A).

In the arc tube body shown in FIG. 33A, the main tube portion 101 is formed by rubber pressing. On the other hand, in the arc tube body shown in FIG. 33B, the main tube portion 101 is formed by performing extrusion molding and then blow molding. In the arc tube body shown in FIGS. 33A and 33B, the thin tube portions 102*a*, 102*b*, and 102*c* are formed by extrusion molding, and the ring-shaped members 103 are formed by die pressing. The components formed independently as described above are connected with each other and then subjected to firing to complete an arc tube body.

However, the arc tube body shown in FIGS. 33A and 33B has the problems as follows. In the arc tube body shown in FIGS. 33A and 33B, the components are formed independently as described above. Therefore, when the arc tube body is used as an arc tube body of a metal vapor discharge tube, internal stress generated due to an increase in the internal pressure at the time of electric discharge is concentrated at the connecting portions between the respective components. In particular, regions 104, which are within the connecting portions between the main tube portion 101 and the ring-shaped members 103 and in the vicinity of the inner walls of the main tube portion 101, have low mechanical strength. Thus, cracks may be generated in the reigns 104 due to the internal stress.

In addition, in the case where components used for manufacturing an arc tube body are formed independently as described above, the process for connecting the components is required, which increases the cost for manufacturing the arc tube body.

As a solution to the above-mentioned problems, a slip casting method is proposed in which an arc tube body is formed integrally (see JP 11(1999)-204086 A). FIG. 34 is a cross-sectional view of an arc tube body formed by the conventional slip casting method. In FIG. 34, reference numeral 100*a* denotes thin tube portions for accommodating electrodes, and reference numeral 100*b* denotes a main tube portion to serve as a discharge space.

FIGS. 35 to 38 are cross-sectional views, each illustrating one process of the conventional slip casting method. It is to be noted that the processes illustrated from FIG. 35 through FIG. 38 are a series of processes. Hereinafter, a method for manufacturing an arc tube body according to the conventional slip casting method will be described with reference to FIGS. 35 to 38.

First, as shown in FIG. 35, a slurry 111 containing ceramic powder, a binder, and water as main components is injected to fill a hollow space inside a plaster mold 110. The hollow space inside the plaster mold 110 is formed so as to correspond to the external shape of an arc tube body to be manufactured.

Next, as shown in FIG. 36, only water from among the above-mentioned three main components contained in the slurry 111 is absorbed in the plaster mold 110, and a mixture 112 of the ceramic powder and the binder are allowed to adhere to the inner surface of the plaster mold 110 until it forms a sufficient thickness to provide a molded article with a desired thickness.

Subsequently, as shown in FIG. 37, excess slurry present in the hollow space is drained and the mixture 112 adhered to the inner surface of the plaster mold 110 is dried. Thereafter, a molded article 113 is taken out of the plaster mold 110. The molded article 113 is then subjected to an after processing such as firing. Thus, an arc tube body as shown in FIG. 34 can be obtained.

However, the slip casting method illustrated by FIGS. 35 to 38 has the following problem. When forming a small arc tube body of a low wattage, e.g., 70 W or less, thin tube portions 100*a* (see FIG. 34) are formed to be very thin. Thus, the thin tube portions 100*a* may be broken when being taken out from the plaster mold 110 or during transport.

Further, in the slip casting method illustrated by FIGS. 35 to 38, the arc tube body is formed by having water absorbed in the plaster mold 110, thereby adhering the mixture of the ceramic powder and the binder to the surface of the plaster mold 110. Therefore, from a macroscopic viewpoint, it can be said that this method can produce an arc tube body with a uniform thickness only. On this account, it is difficult to make only the thickness of tapered portions at the boundaries between the respective thin tube portions 100 and the main tube portion 100*b* greater than the thickness of other portions, for example.

Even in the case where an arc tube body is formed by the above-mentioned slip casting method, the thickness of the arc tube body can be changed partially by mechanically processing the molded article, for example. However, such mechanical processing increases the cost for manufacturing the arc tube body.

Further, a luminescent lamp provided with an arc tube body manufactured according to the slip casting method illustrated by FIGS. 35 to 38 may fail to light up. The reason for this is considered that calcium contained in the plaster mold 110 as a main component may adhere to the surface of the hollow molded article 113, which is to be processed into an arc tube body.

Therefore, it is an object of the present invention to solve the above-mentioned problems and to provide a method for manufacturing an arc tube body, capable of forming an arc tube body integrally and of reducing the chances that thin tube portions of the arc tube body might be broken, and a core used in the method.

DISCLOSURE OF INVENTION

In order to achieve the above object, a method for manufacturing an arc tube body according to the present invention is a method for manufacturing an arc tube body, which includes a main tube portion to be a discharge space and thin tube portions for accommodating electrodes, using a pair of molds and a material to be injected thereinto. The method includes at least disposing a core in a hollow space formed by the molds before injecting the material, and the core includes portions for forming an internal shape of the thin tube portions, a portion for forming an internal shape of the main tube portion, and a shaft disposed in the portions for forming an internal shape of the thin tube portions.

In the above-mentioned method for manufacturing an arc tube body according to the present invention, it is preferable that the molds are formed of a metallic material, a resin material, or a ceramic material and that the material to be injected into a space between the molds and the core is a slurry containing ceramic powder, a solvent, and a hardening agent as main components. Preferably, the above-mentioned method further includes: forming a hardened slurry by solidifying the slurry injected into the hollow space where the core is disposed; taking out the hardened slurry integrated with the core from the molds and separating the hardened slurry and the core; and firing the hardened slurry from which the core has been separated.

Further, the above-mentioned method for manufacturing an arc tube body according to the present invention preferably includes disposing the shaft in a hollow space formed by a pair of core formation molds and filling the hollow space with a fusible material or a combustible material so that at least a portion of the core for forming an internal shape of the main tube portion of the arc tube body is formed of the fusible material or the combustible material.

Furthermore, in the above-mentioned method for manufacturing an arc tube body according to the present invention, it is preferable that the core comprises two portions for forming an internal shape of the thin tube portions, one of the two portions facing the other portion with the portion for forming the main tube portion intervening therebetween, and a shaft present at one of the two portions and a shaft present at the other portion are defined by one common shaft. The core may comprise at least two shafts.

In the above-mentioned method for manufacturing an arc tube body according to the present invention, a layer of a fusible material or a combustible material may be formed around the shaft. The shaft may be formed of a metallic material, a resin material, or a ceramic material. Further, in the case where the shaft is formed of a material that generates heat when an electric current is applied thereto, heat generated from the shaft melts a portion formed of the fusible material of the core, thereby allowing the hardened slurry and the core to be separated from each other.

Next, in order to achieve the above object, a core used for manufacturing an arc tube body according to the present invention is a core used for manufacturing an arc tube body, which comprises a main tube portion to be a discharge space and thin tube portions for accommodating electrodes, using a pair of molds and a material to be injected thereinto, and the core is disposed in a hollow space formed by the pair of molds before injecting the material. The core according to the present invention includes portions for forming an internal shape of the thin tube portions, a portion for forming an internal shape of the main tube portion, and a shaft disposed in the portions for forming an internal shape of the thin tube portion.

In the above-mentioned core according to the present invention, it is preferable that the portion for forming an internal shape of the main tube portion is formed of a fusible material or a combustible material. It is also preferable that the core comprises two portions for forming an internal shape of the thin tube portions, one of the two portions facing the other portion with the portion for forming the main tube portion intervening therebetween, and a shaft present at one of the two portions and a shaft present at the other portion are defined by one common shaft.

Further, in the above-mentioned core according to the present invention, the core may include at least two shafts. Further, the portions for forming an internal shape of the thin tube portions may be formed by forming a layer of a fusible material or a combustible material around the shaft. Furthermore, the shaft may be formed of a metallic material, a resin material, or a ceramic material. Alternatively, the shaft may be formed of a material that generates heat when an electric current is applied thereto.

BEST MODE FOR CARRYING OUT THE INVENTION

Embodiment 1

Hereinafter, a method for manufacturing an arc tube body and a core used in the method according to Embodiment 1 will be described with reference to FIGS. 1 to 10. FIGS. 1 to 10 are cross-sectional views, each illustrating one process of the method for manufacturing an arc tube body according to Embodiment 1. It is to be noted that the processes illustrated from FIG. 1 through FIG. 10 are a series of processes. The manufacturing method according to Embodiment 1 includes processes for manufacturing a core according to Embodiment 1. Among FIGS. 1 to 10, FIGS. 1 to 4 illustrate a series of processes for manufacturing a core according to Embodiment 1.

The method for manufacturing an arc tube body according to Embodiment 1 includes placing a core according to Embodiment 1 in a hollow space formed by a pair of molds for forming an arc tube body (hereinafter, referred to as "arc tube body formation molds") and then injecting a material into a space between the arc tube body formation molds and the core. An arc tube body obtained by this method includes a main tube portion to serve as a discharge space and a pair of (i.e., two) thin tube portions for accommodating electrodes (see FIG. 10, which will be described later).

Figure 1:
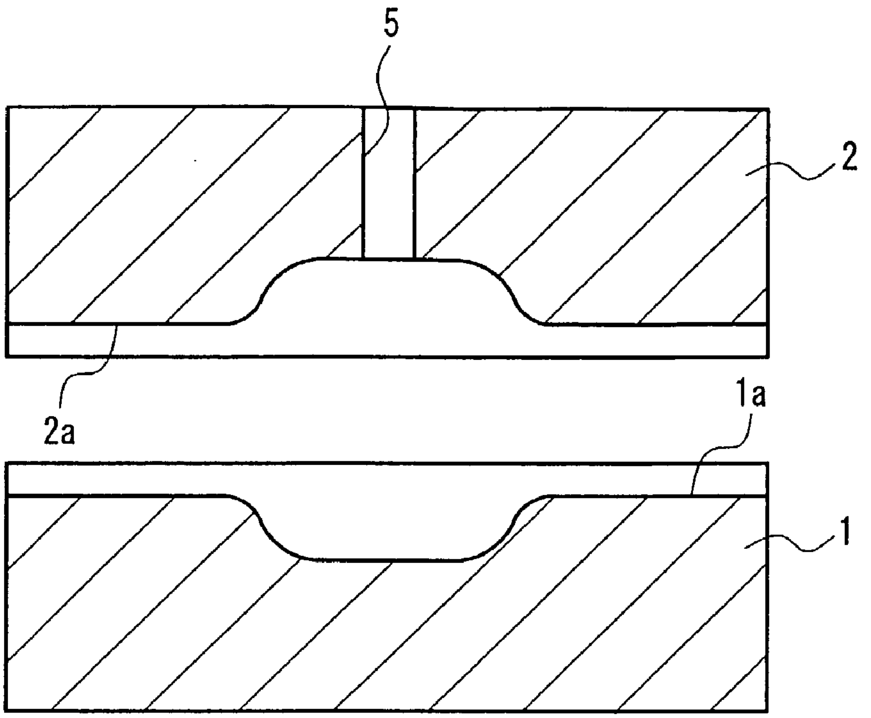
FIG. 1 is a cross-sectional view illustrating one process of a method for manufacturing an arc tube body according to Embodiment 1.

First, as shown in FIG. 1, molds 1 and 2 for forming a core (hereinafter, referred to as "core formation molds") are provided. The core formation mold 1 has a recess 1*a* and the core formation mold 2 has a recess 2*a*. Accordingly, when the core formation molds 1 and 2 are bonded to each other, a hollow space is formed by the recesses 1*a* and 2*a*. The recesses 1*a* and 2*a* are formed so that they can form a hollow space corresponding to the shape of a core to be formed.

As described later, a firing process and the like are performed to complete an arc tube body. Further, the internal shape of the arc tube body is formed by the core. Therefore, the recesses 1*a* and 2*a* are formed considering the shrinkage of the arc tube body after firing so that the arc tube body will have a predetermined internal shape after firing.

Reference numeral 5 is an inlet through which a material is injected. The inlet 5 is provided so that the material flows into the hollow space from the central portion of the recess 2*a*. In Embodiment 1, the core formation molds 1 and 2 are formed of stainless steel. However, the material of the core formation molds 1 and 2 is not limited to stainless steel, and can be other metallic materials such as aluminum and the like; resin materials such as acrylate, nylon, and the like; or ceramic materials containing no calcium, such as alumina and the like.

Figure 2:
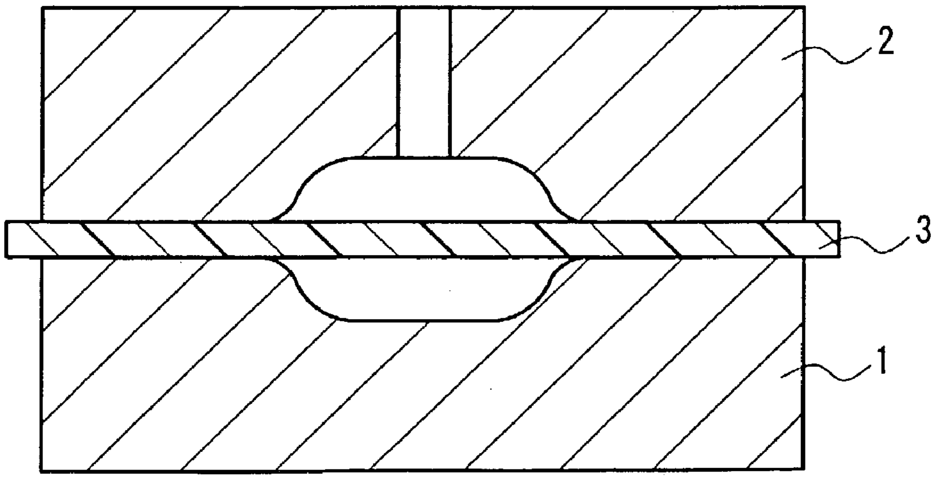
FIG. 2 is a cross-sectional view illustrating another process of the method for manufacturing an arc tube body according to Embodiment 1.

Next, as shown in FIG. 2, the core formation molds 1 and 2 are bonded to each other, and a shaft 3 is disposed in the hollow space formed by the recesses 1*a* and 2*a*. The shaft 3 is disposed in such a manner that the central axis thereof coincides with the central axis of a core to be formed. Every portion of the shaft 3 except for the central portion is in close contact with the core formation molds 1 and 2. In Embodiment 1, one core wire formed of a resin material is used as the shaft 3. This shaft 3 will be the central axis of a core to be obtained. The shaft 3 may be formed of a material other than the resin material, such as a metallic material, a ceramic material, etc. The diameter of the shaft 3 has an effect on the inner diameter of an arc tube body to be obtained, and thus is determined considering the shrinkage after firing.

Figure 3:
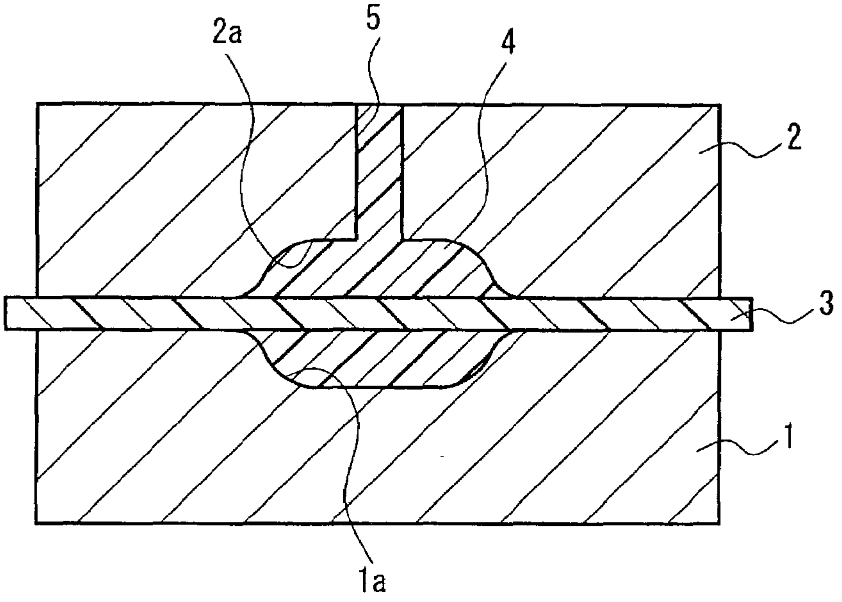
FIG. 3 is a cross-sectional view illustrating another process of the method for manufacturing an arc tube body according to Embodiment 1.

Then, as shown in FIG. 3, the hollow space where the shaft 3 is disposed is filled with a fusible material 4. In Embodiment 1, paraffin wax (melting point: 70° C.) is used as the fusible material 4. The paraffin wax that has been heated and melted at 90° C. is injected into the hollow space through the inlet 5. After the injection, the core formation molds 1 and 2 holding the fusible material 4 are left until they cool down to room temperature so that the fusible material 4 is solidified.

Figure 4:
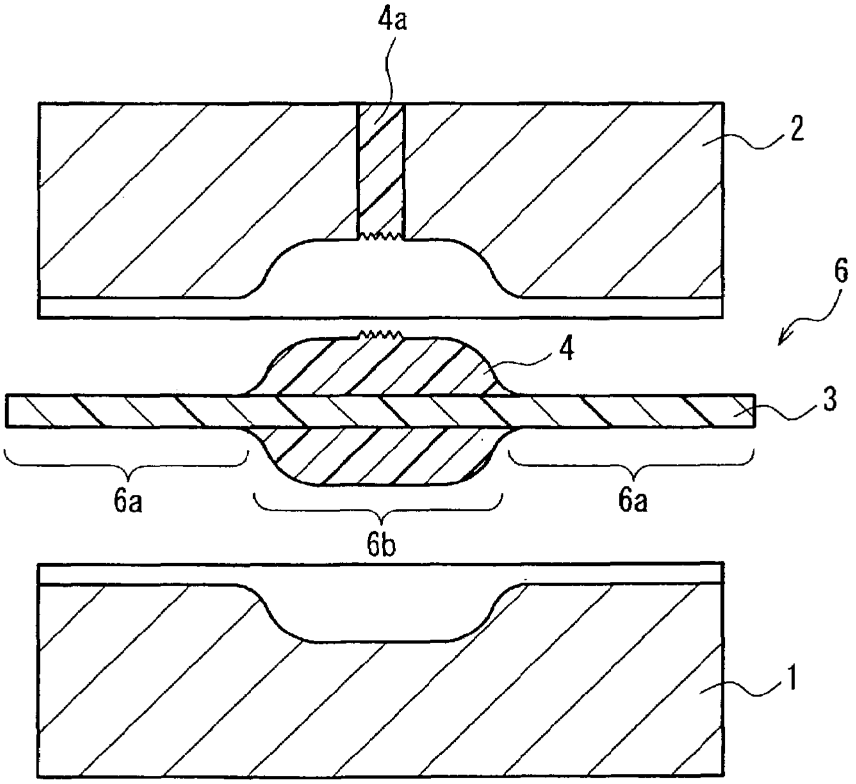
FIG. 4 is a cross-sectional view illustrating another process of the method for manufacturing an arc tube body according to Embodiment 1.

After that, as shown in FIG. 4, the bonded core formation molds 1 and 2 are separated from each other to obtain a core 6. The core 6 includes a portion 6*b* for forming an internal shape of a main tube portion of an arc tube body (hereinafter, referred to as a "main tube formation portion") and portions 6*a* for forming an internal shape of thin tube portions of an arc tube body (hereinafter, referred to as "thin tube formation portions"). In Embodiment 1, the core 6 includes two thin tube formation portions 6*a*, one of the thin tube formation portions 6*a* facing the other thin tube formation portion 6*a* with the main tube formation portion 6*b* intervening therebetween.

In the core 6 according to Embodiment 1, only the main tube formation portion 6*b* is formed of the fusible material 4. The thin tube formation portions 6*a* are formed of the shaft 3 only, and include no fusible material 4. The shaft present at one thin tube formation portion 6*a* and the shaft present at the other thin tube formation portion 6*a* are defined by one common shaft 3.

A solidified fusible material 4*a* present at a portion from which the fusible material 4 is injected (i.e., inside the inlet 5) is cut from the core 6 when separating the core formation molds 1 and 2. However, since the portion of the core 6 from which the fusible material 4*a* has been cut has a great surface roughness, it is necessary to polish the core 6 to the required extent.

Figure 5:
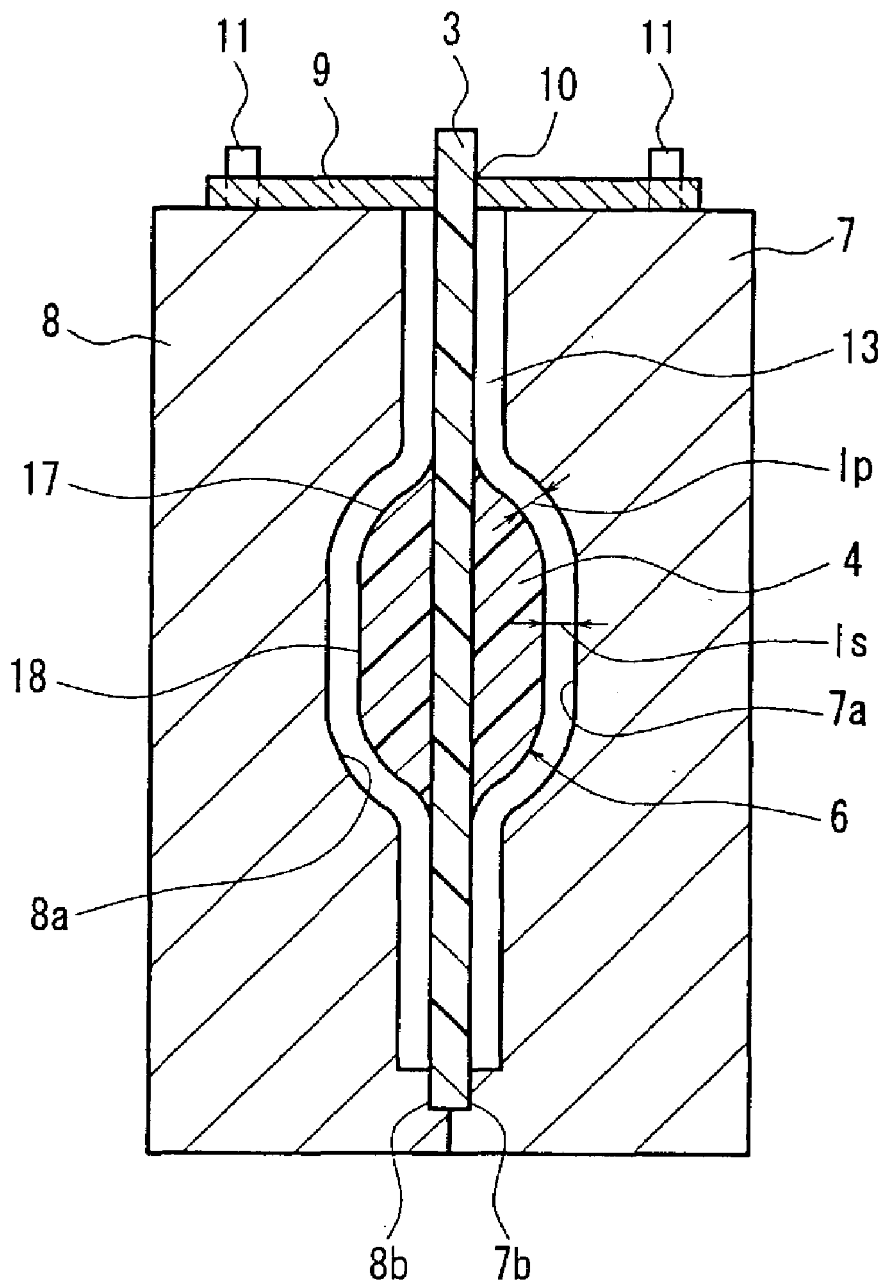
FIG. 5 is a cross-sectional view illustrating another process of the method for manufacturing an arc tube body according to Embodiment 1.

Subsequently, as shown in FIG. 5, an arc tube body formation mold 7 having a recess 7*a* and an arc tube body formation mold 8 having a recess 8*a* are provided, and the core 6 obtained in the above-mentioned manner is disposed in a hollow space formed by the recesses 7*a* and 8*a*. The recesses 7*a* and 8*a* are formed so that they can form a hollow space corresponding to the shape of an arc tube body to be formed. Thus, a space 13 for forming an arc tube body is formed between the respective recesses 7*a*, 8*a* and the core 6.

A molded article formed using the arc tube body formation molds 7, 8 and the core 6 turns into an arc tube body after being subjected to firing. Therefore, the recesses 7*a* and 8*a* are formed considering the shrinkage of the molded article after firing so that an arc tube body having a predetermined external shape is obtained after firing. In Embodiment 1, the arc tube body formation molds 7 and 8 are formed of stainless steel. However, the material of the arc tube body formation molds 7 and 8 is not limited to stainless steel, and can be other metallic materials; resin materials; and ceramic materials.

When disposing the core 6 in the hollow space, if the position adjustment of the core 6 with respect to the arc tube body formation molds 7 and 8 is insufficient, an arc tube body to be obtained will have a nonuniform thickness. On this account, in the present embodiment, one end of the shaft 3 is inserted into and fixed to a hole formed by recesses 7*b* and 8*b* formed in the arc tube body formation molds 7 and 8, respectively. Further, a plate member 9 for positioning, which is provided with a hole 10 having the same diameter as the shaft 3, is attached to the bonded outer surfaces of the arc tube body formation molds 7 and 8 on the side of the other end of the shaft 3, and the other end of the shaft 3 is inserted into and fixed to the hole 10. According to this configuration, the position adjustment of the core 6 with respect to the arc tube body formation molds 7 and 8 can be carried out with high precision. Reference numeral 11 denotes positioning pins for fixing the plate member 9 to the arc tube body formation molds 7 and 8.

Figure 6:
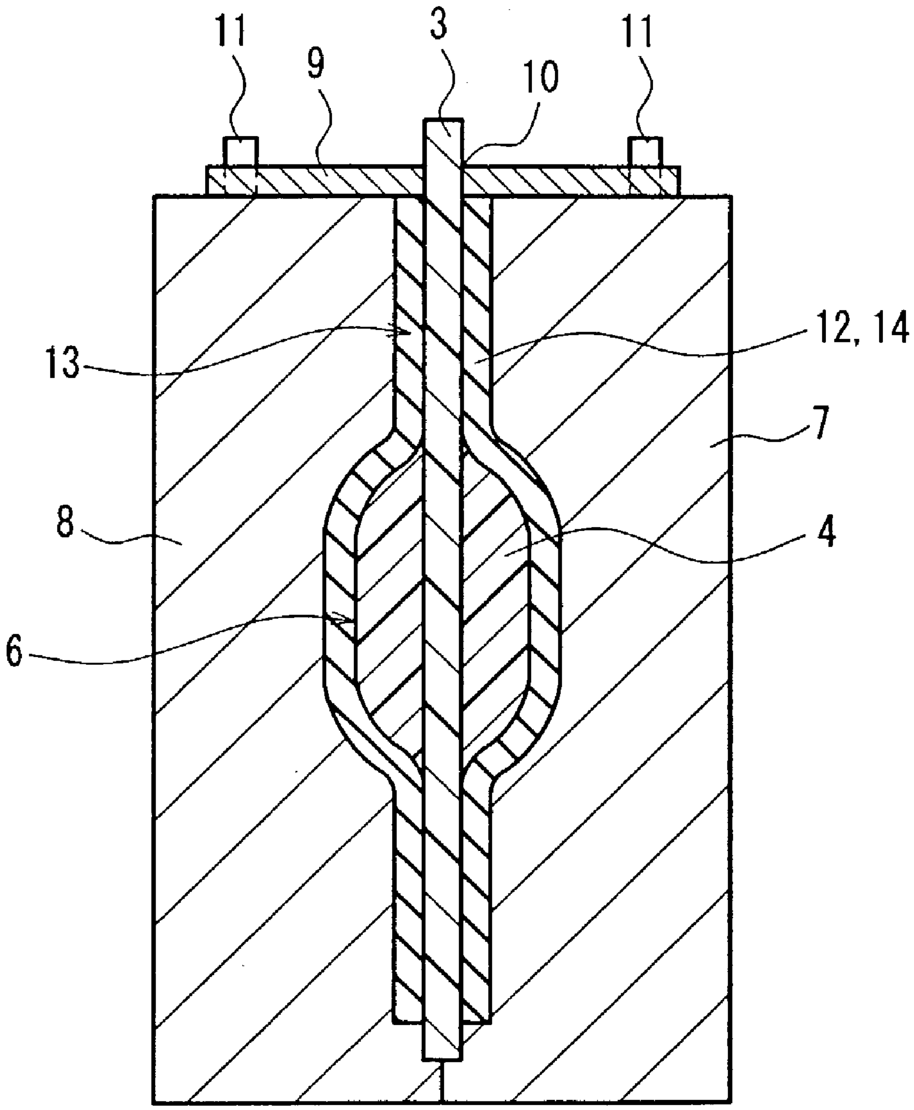
FIG. 6 is a cross-sectional view illustrating another process of the method for manufacturing an arc tube body according to Embodiment 1.

Next, as shown in FIG. 6, a slurry 12 containing ceramic powder, a solvent, and a hardening agent as main components is injected into the space 13. The slurry 12 will be a main component of an arc tube body to be obtained. In Embodiment 1, the slurry 12 is prepared in the following manner. First, 100 parts by weight of alumina powder is mixed with 0.05 part by weight of magnesium oxide as an additive, 1.0 part by weight of polycarboxylate as a dispersing agent, 10 parts by weight of a water-soluble epoxy resin as a hardening agent, and 25 parts by weight of water as a solvent in a vessel. Then, 2 parts by weight of an amine-based hardening agent that reacts with the water-soluble epoxy resin to cause hardening is added to and mixed with the resultant mixture in the vessel. Thus, the slurry 12 is prepared.

After the slurry 12 is injected into the space 13, the arc tube body formation molds 7 and 8 are left for 2 days at room temperature. The slurry 12 is solidified by the action of the hardening agent, thus giving a hardened slurry 14. In Embodiment 1, the epoxy resin is used as a hardening agent. However, the hardening resin is not limited thereto, and can be, for example, phenol resins, urea resins, urethane resins, and the like that can be hardened at room temperature or by heating. The same effect can be obtained when these resins are used as a hardening agent.

Further, in Embodiment 1, the slurry is hardened by the action of the hardening agent. However, the slurry may be hardened by other actions, such as a sol-gel transition, for example. It is also possible to harden the slurry by forming cross-linked polymers. This can be achieved by adding monomers to the slurry and then causing the radical polymerization of the monomers.

Figure 7:
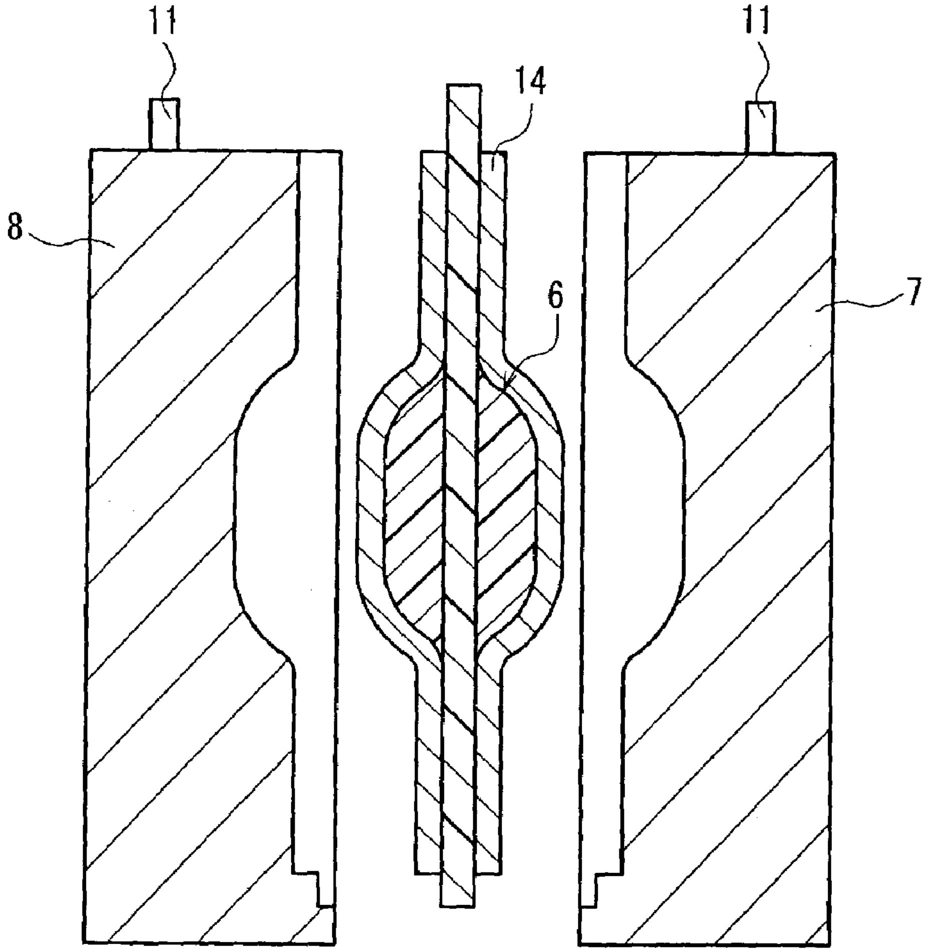
FIG. 7 is a cross-sectional view illustrating another process of the method for manufacturing an arc tube body according to Embodiment 1.
Figure 8:
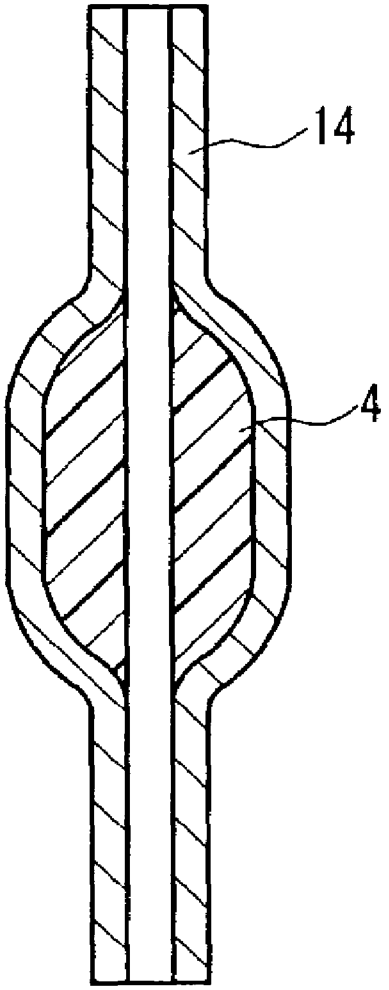
FIG. 8 is a cross-sectional view illustrating another process of the method for manufacturing an arc tube body according to Embodiment 1.

Then, as shown in FIG. 7, the arc tube body formation molds 7 and 8 are separated from each other to take out the hardened slurry 14 integrated with the core 6. Further, as shown in FIG. 8, the shaft 3 is pulled out from the hardened slurry 14 integrated with the core 6. In this manner, the hardened slurry 14 with the solidified fusible material 4 remaining inside can be obtained.

In Embodiment 1, the shaft 3 forming the core 6 may be formed of a material that generates heat when a current is applied thereto, e.g., a nichrome wire and the like. When the shaft 3 is formed of such a material, it is possible to melt the fusible material 4 around the shaft 3 by applying a current from both ends of the shaft 3 to cause the shaft 3 to generate heat. The adhesion between the shaft 3 and the fusible material 4 thus becomes weaker, which allows the shaft 3 to be removed easily.

The shaft 3 also may be formed of a material having high thermal conductivity. When the shaft 3 is formed of such a material, it is possible to melt the fusible material 4 around the shaft 3 by conducting heat from both ends of the shaft 3. Thus, similarly to the case of the nichrome wire as described above, the adhesion between the shaft 3 and the fusible material 4 becomes weaker, which allows the shaft 3 to be removed easily.

Figure 9:
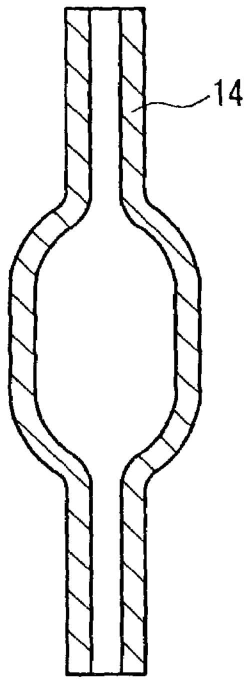
FIG. 9 is a cross-sectional view illustrating another process of the method for manufacturing an arc tube body according to Embodiment 1.

Subsequently, the hardened slurry 14 with the fusible material 4 remaining inside is placed in a constant temperature bath set at 90° C. so that the solidified fusible material 4 is melted and drained from the hardened slurry 14, as shown in FIG. 9. Then, the hardened slurry 14, which is hollow after the fusible material 4 has been drained, is kept at 400° C. for 5 hours in the air so that an organic constituent contained therein is decomposed and evaporated off. After that, the hardened slurry 14 is subjected to pre-firing at 1300° C. for 2 hours. The hardened slurry 14 thus pre-fired is then fired at 1900° C. for 2 hours in a hydrogen atmosphere so that the hardened slurry 14 is sintered.

Figure 10:
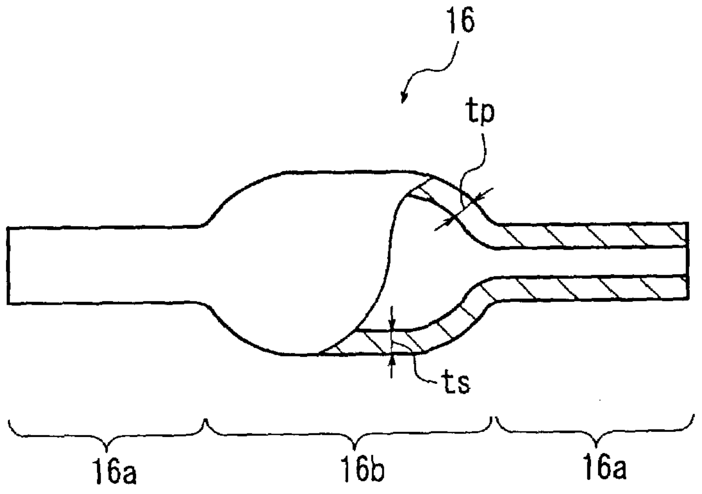
FIG. 10 is a cross-sectional view illustrating another process of the method for manufacturing an arc tube body according to Embodiment 1.

Through the above-mentioned processes, eventually, a translucent arc tube body 16 for a metal vapor discharge lamp as shown in FIG. 10 can be obtained. In FIG. 10, reference numeral 16*a* denotes thin tube portions for accommodating electrodes, and reference numeral 16*b* denotes a main tube portion to serve as a discharge space.

As described above, a method for manufacturing an arc tube body according to Embodiment 1 is characterized in that the core 6 including the thin tube formation portions 6*a* defined by the shaft 3 is used (see FIGS. 5 to 7). Accordingly, the inner diameter of the thin tube portions 16*a* of the arc tube body 16 can be controlled by selecting the outer diameter of the shaft 3. As a result, an arc tube body including thin tube portions that are thinner than those in conventional arc tube bodies can be obtained. In addition, since the core is provided with the shaft 3, the chances that the portions to be the thin tube portions 16*a* in the molded article might be broken due to the force applied when separating the arc tube body formation molds 7 and 8, vibrations during the transportation, etc., can be reduced.

Further, in an arc tube body for a metal vapor discharge lamp of a relatively low wattage, e.g., 70 W, the thin tube portions 16*a* are very long and narrow. For example, they are about 0.8 mm in inner diameter and about 25 mm in length. In this case, the diameter of the thin tube formation portions 6*a* of the core 6 is required to be about 1 mm. Therefore, in the case where a core formed of a soft material is used, long and narrow portions, i.e., the thin tube formation portions, are liable to be broken, resulting in a considerably reduced manufacturing yield. However, in Embodiment 1, since the thin tube formation portions include the shaft 3 as described above, the chances that the thin tube formation portions might be broken can be reduced, which causes the productivity to be improved remarkably.

As described above, the conventional slip casting method has the problem that it can produce an arc tube body with a uniform thickness only and requires a mechanical processing after the formation or the firing of the arc tube body in order to change the thickness of the arc tube body as desired. In contrast, in Embodiment 1, it is possible to design the thickness of an arc tube body as desired by changing the shape of the core 6.

This will be described by taking the following case as an example. In FIG. 10, the thickness "tp" of the tapered portion of the main tube portion 16*b* at the boundaries between the respective thin tube portions 16*a* and the main tube portion 16*b* is desired to be greater than the thickness "ts" of the straight central portion of the main tube portion 16*b*. This can be achieved by designing the shape of the core 6 so that, in FIG. 5, the distance "lp" between a tapered portion 17 of the core 6 and the arc tube body formation mold 7 or 8 is greater than the distance "ls" between a straight portion 18 of the core 6 and the arc tube body formation mold 7 or 8.

The transmittance and the mechanical strength of the arc tube body 16 obtained in the above-mentioned manner were measured. As a result, it was found that the thus-obtained arc tube body 16 had the transmittance and the mechanical strength equivalent to those of the conventional arc tube body manufactured by the above-mentioned slip casting method. Also, the composition of the arc tube body 16 was analyzed. As a result, it was confirmed that the arc tube body 16 contained no calcium. This is because the arc tube body 16 was formed using the metal molds made of stainless steel as the core formation molds 1 and 2 and as the arc tube body formation molds 7 and 8.

Figure 39:
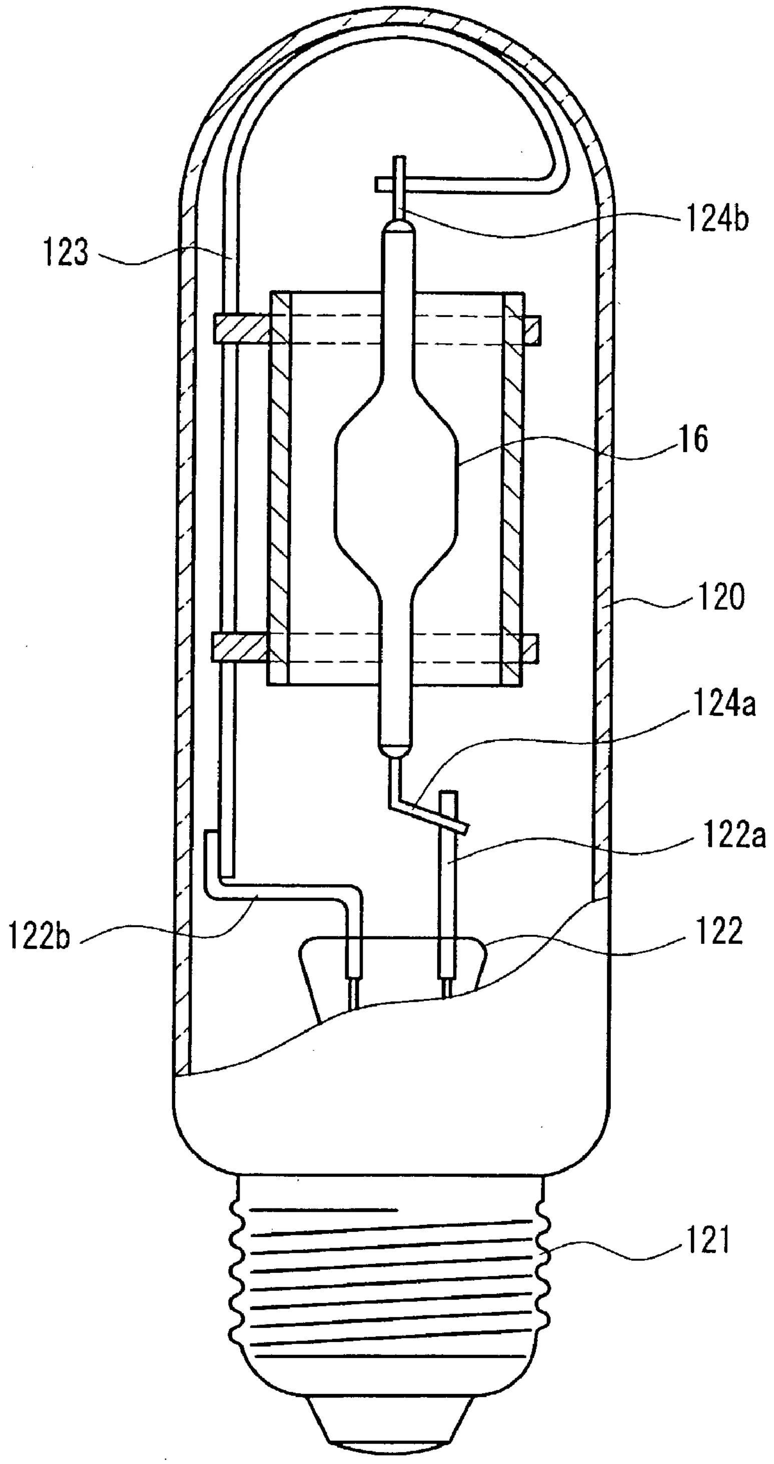
FIG. 39 is a schematic view showing a configuration of a metal vapor discharge lamp provided with an arc tube body according to Embodiment 1.

Further, 100 samples of the arc tube body 16 shown in FIG. 10 were manufactured, and then, 100 samples of the metal vapor discharge lamp shown in FIG. 39 were manufactured using the samples of the arc tube body 16 to conduct a lighting test. FIG. 39 is a schematic view showing a configuration of the metal vapor discharge lamp provided with the arc tube body according to Embodiment 1.

As shown in FIG. 39, the arc tube body 16 is contained in an outer tube 120, which is closed on one end and open on the other end. Lead wires 124*a* and 124*b* are provided in the two thin tube portions of the arc tube body 16 so as to be connected to electrodes (not shown) placed inside the arc tube body 16. A lamp base 121 is attached to the open end of the outer tube 120. Reference numerals 122*a* and 122*b* are stem leads extending from a stem 122. The stem lead 122*a* is connected to the lead wire 124*a*, and the stem lead 122*b* is connected to the lead wire 124*b* via a power supply wire 123.

The lighting test showed that none of the sample lamps failed to light up. Thus, it is understood that an arc tube body manufactured by the method according to Embodiment 1 has good quality. In contrast, in the case of the metal vapor discharge lamp provided with an arc tube body manufactured by the conventional method, 5 out of 100 samples failed to light up.

FIGS. 1 to 10 shows an example in which paraffin wax is used as the fusible material 4 for forming the core 6. Here, an arc tube body was manufactured in the same manner as that shown in FIGS. 1 to 10 except that a core was formed using an ethylene-vinyl acetate resin, which can be heated and melted around 100° C., in place of paraffin wax.

In this case, an arc tube body having the same size, the same shape, and the same ceramic characteristics as those of the arc tube body 6 shown in FIG. 10 could be obtained. Needless to say, in Embodiment 1, any resin that can be heated and melted at a low temperature, e.g., polyethylene resins, can be used as a material for forming a core, and the same effect can be obtained even in the case where materials other than the wax and the ethylene-vinyl acetate resin are used.

Embodiment 2

Hereinafter, a method for manufacturing an arc tube body and a core used in the method according to Embodiment 2 will be described with reference to FIGS. 11 to 14. FIGS. 11 to 14 are cross-sectional views, each illustrating one process of the method for manufacturing an arc tube body according to Embodiment 2. It is to be noted that the processes illustrated from FIG. 11 through FIG. 14 are a series of processes.

In the method for manufacturing an arc tube body according to Embodiment 2, an arc tube body is manufactured by injecting a material into arc tube body formation molds, similarly to the method according to Embodiment 1. An arc tube body manufactured by the method according to Embodiment 2 has the same configuration as that of the arc tube body shown in FIG. 10. Embodiment 2 differs from Embodiment 1 in that a layer of a fusible material covers a shaft also at thin tube formation portions of a core. In other words, in Embodiment 2, the thin tube formation portions of the core include a shaft and a fusible material.

Figure 11:
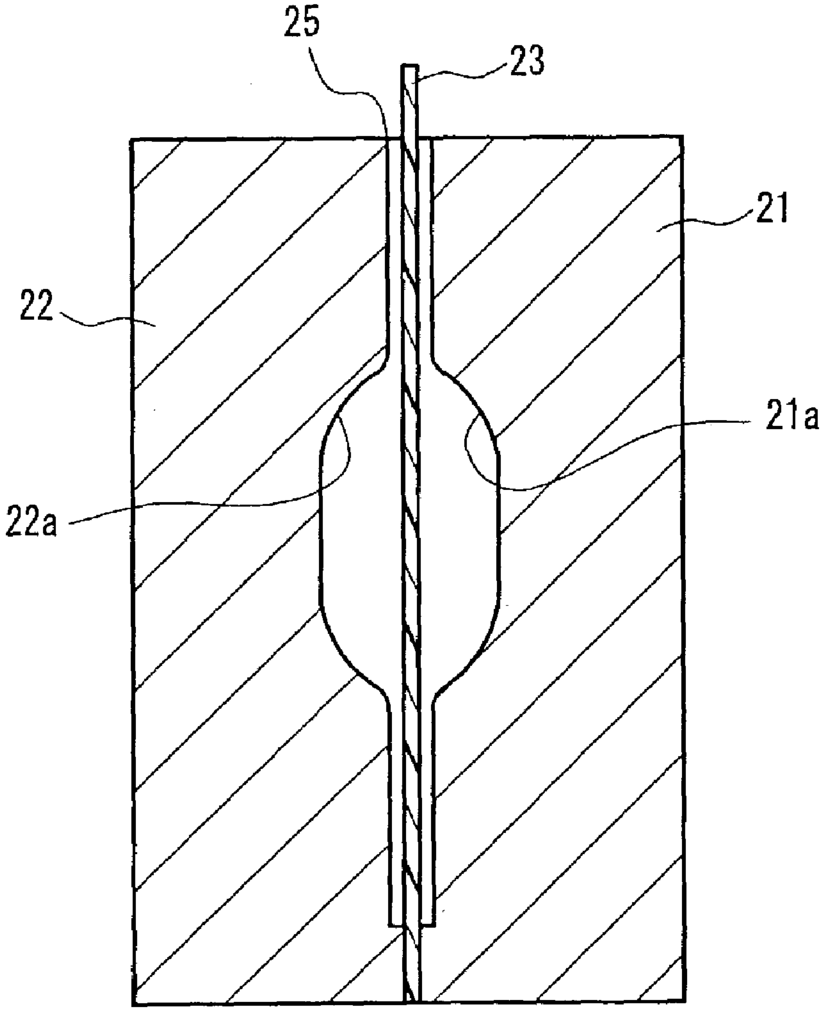
FIG. 11 is a cross-sectional view illustrating one process of a method for manufacturing an arc tube body according to Embodiment 2.

First, a core formation mold 21 having a recess 21*a* and a core formation mold 22 having a recess 22*a* are provided. The core formation molds 21 and 22 are bonded to each other, and a shaft 23 is disposed in the hollow space formed by the recesses 21*a* and 22*a*, as shown in FIG. 11.

Similarly to the core formation molds used in Embodiment 1, the recesses 21*a* and 22*a* are formed considering the shrinkage of an arc tube body after firing. In Embodiment 2, the core formation molds 21 and 22 also are formed of stainless steel. However, as in Embodiment 1, the material of the core formation molds 21 and 22 is not limited to stainless steel. Unlike Embodiment 1, a core wire formed of stainless steel is used as the shaft 23. Further, unlike Embodiment 1, the shaft 23 is not in contact with the recesses 21*a* and 22*a*.

Figure 12:
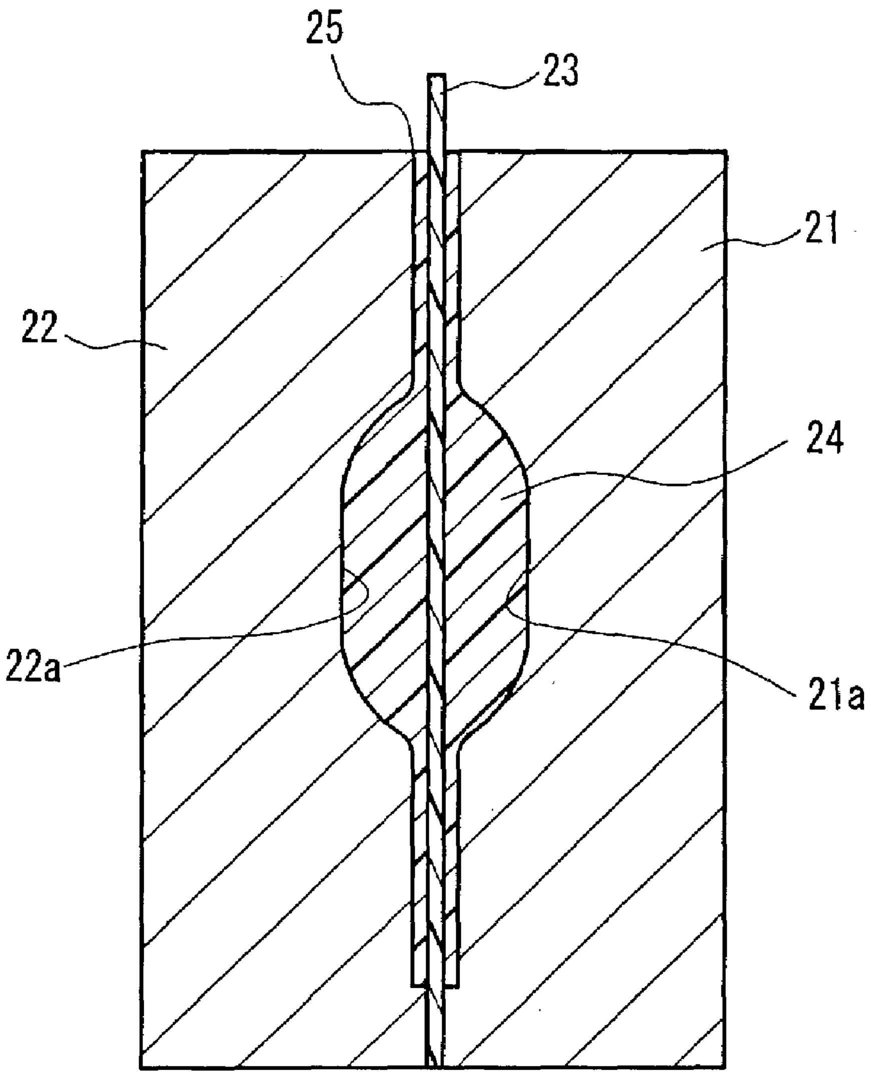
FIG. 12 is a cross-sectional view illustrating another process of the method for manufacturing an arc tube body according to Embodiment 2.

Next, as shown in FIG. 12, the hollow space where the shaft 23 is disposed is filled with a fusible material 24. Also in Embodiment 2, paraffin wax is used as the fusible material 24 as in Embodiment 1. The fusible material 24 is injected into the hollow space through an inlet 25. After the injection, the core formation molds 21 and 22 holding the fusible material 24 are left until they cool down to room temperature so that the fusible material 24 is solidified.

Figure 13:
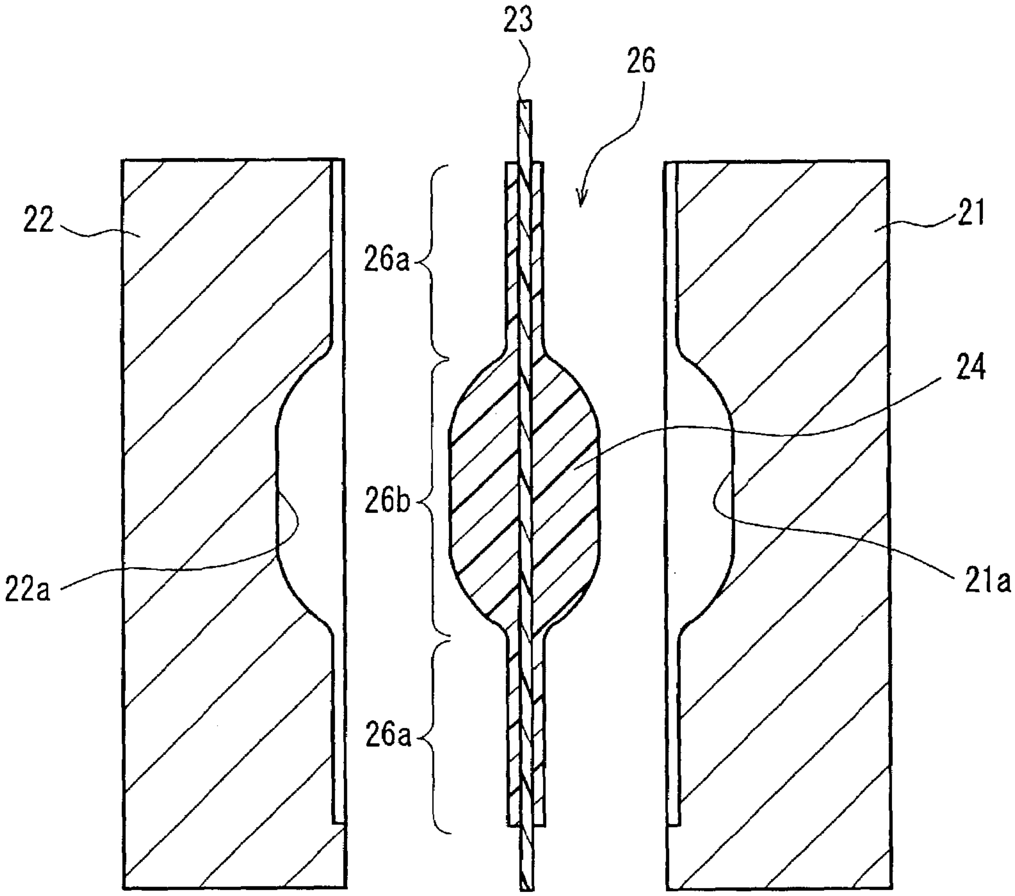
FIG. 13 is a cross-sectional view illustrating another process of the method for manufacturing an arc tube body according to Embodiment 2.

After that, as shown in FIG. 13, the bonded core formation molds 21 and 22 are separated from each other to obtain a core 26. The core 26 thus obtained includes two thin tube formation portions 26*a* and one main tube formation portion 26*b* intervening therebetween, similarly to the core 6 used in Embodiment 1. However, Embodiment 2 differs from Embodiment 1 in that not only the main tube formation portion 26*b* but also the thin tube formation portions 26*a* are formed using the fusible material 24.

In Embodiment 2, the inlet 25 is not provided so that the material flows into the main tube formation portion 26*b* as in Embodiment 1, but is provided so that the material flows into the hollow space from an end of one of the thin tube formation portions 26*a*. Therefore, a portion for forming a main tube portion of an arc tube body (the main portion has a great effect on the lamp characteristics), i.e., the tube formation portion 26*b*, does not have a rough surface as in Embodiment 1, which eliminates the necessity of polishing the core as required in Embodiment 1.

It is to be noted that, in Embodiment 2, the inlet 25 may be provided so that the material flows into the main tube formation portion 26*b* as in Embodiment 1. In this case, it is still possible to obtain the core 26 in which not only the main tube formation portion 26*b* but also the thin tube formation portions 26*a* are formed using the fusible material 24 as shown in FIG. 13.

Figure 14A:
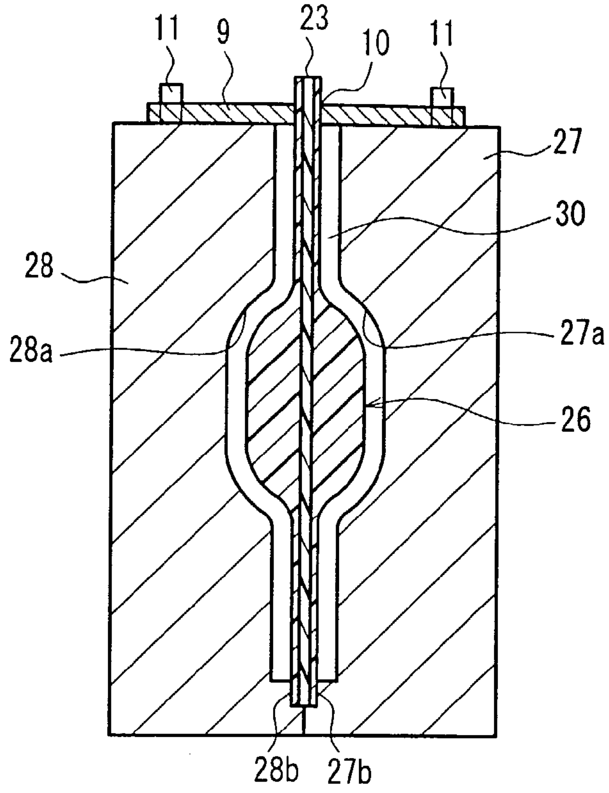
FIG. 14A is a cross-sectional view illustrating another process of the method for manufacturing an arc tube body according to Embodiment 2.

Subsequently, as shown in FIG. 14A, an arc tube body formation mold 27 having a recess 27*a* and an arc tube body formation mold 28 having a recess 28*a* are provided, and the core 26 obtained in the above-mentioned manner is disposed in a hollow space formed by the recesses 27*a* and 28*a*. The core 26 is disposed in the same manner as shown in FIG. 5 of Embodiment 1, and the arc tube body formation molds 27 and 28 also have recesses 27*b* and 28*b* for positioning, respectively.

Thereafter, a slurry is injected into a space 30 for forming an arc tube body and is solidified; a hardened slurry integrated with the core 26 is taken out from the arc tube body formation molds 27 and 28; and the hardened slurry integrated with the core 26 is fired after the shaft 23 and the fusible material 24 forming the core 26 have been removed, in the same manner as that in Embodiment 1 (see FIGS. 6 to 9). Thus, an arc tube body similar to that of Embodiment 1 can be obtained (see FIG. 10). The slurry used in Embodiment 2 is the same as that used in Embodiment 1.

As described above, the method for manufacturing an arc tube body according to Embodiment 2 also is characterized in that a core including a shaft at thin tube formation portions is used, similarly to the method according to Embodiment 1. Therefore, Embodiment 2 can produce the same effects as those described in Embodiment 1.

Figure 14B:
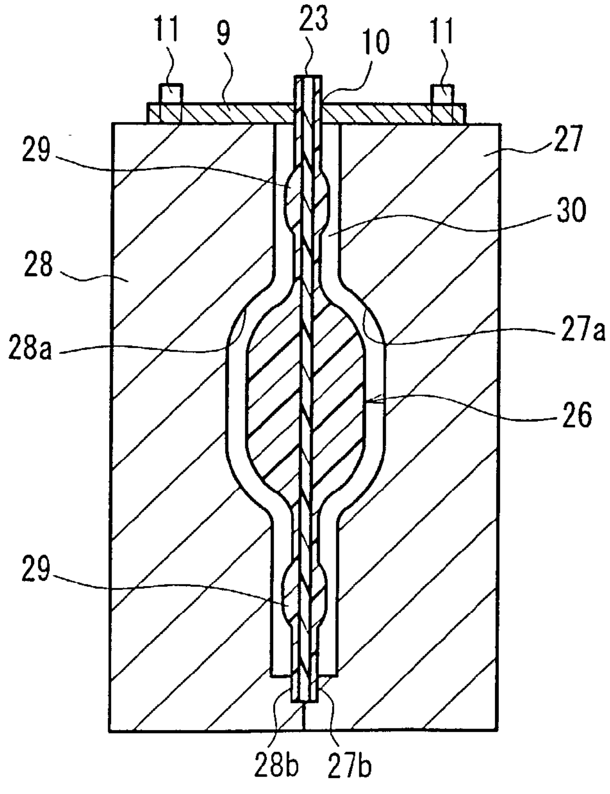
FIG. 14B is a cross-sectional view of the same in which projections are formed on thin tube formation portions of a core.

However, Embodiment 2 can produce another effect in addition to the effects as described in Embodiment 1. Specifically, Embodiment 2 can provide a high degree of freedom in the design of the internal shape of thin tube portions of an arc tube body, i.e., in the design of the external shape of the core 26. For example, by providing recesses in a portion for forming the thin tube formation portions 26*a* of the core formation molds 21 and 22 shown in FIGS. 11 to 13, projections 29 as shown in FIG. 14B easily can be provided in the thin tube formation portions of the core. Accordingly, the internal shape of thin tube portions of an arc tube body easily can be designed so as to have a recess and a projection in the middle portions thereof.

Further, in Embodiment 1, the shaft of the core needs to be removed from the hardened slurry before removing the fusible material. In contrast, in Embodiment 2, the hardened slurry may be heated without removing the shaft 23, and the shaft 23 can be removed together with the fusible material 24.

Embodiment 3

Figure 15:
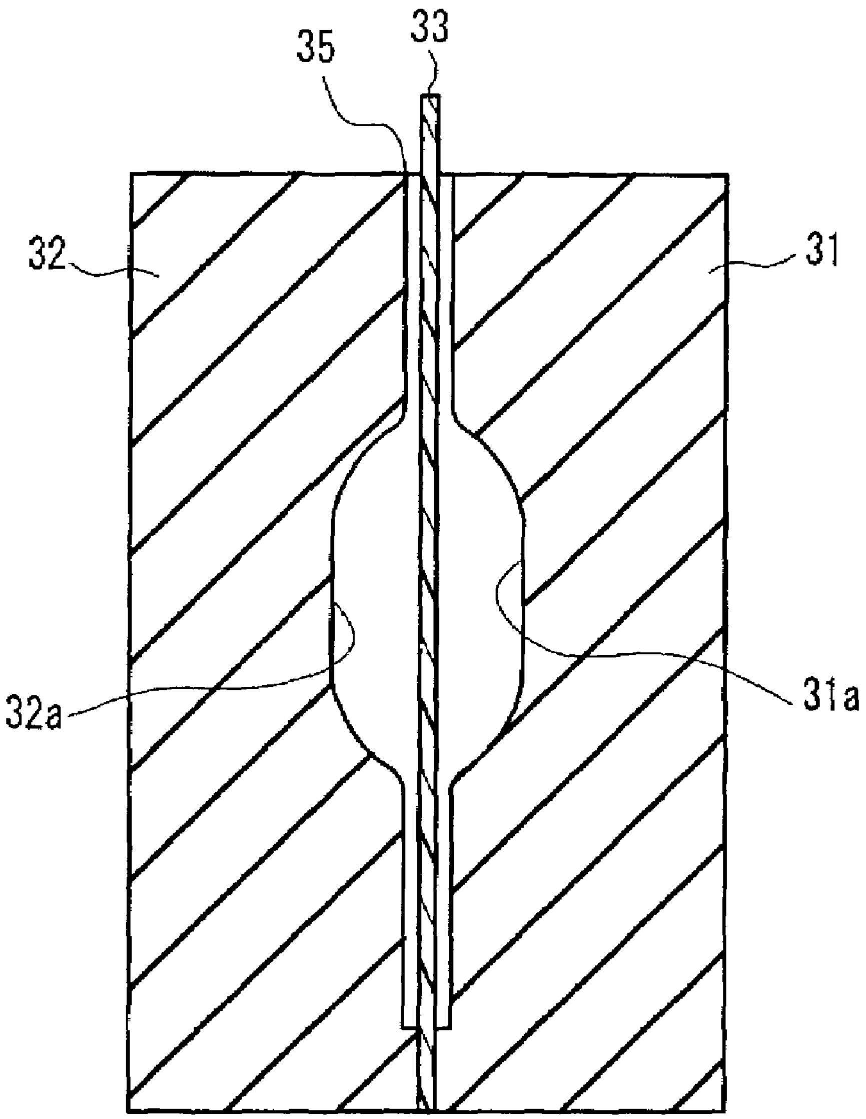
FIG. 15 is a cross-sectional view illustrating one process of a method for manufacturing an arc tube body according to Embodiment 3.
Figure 16:
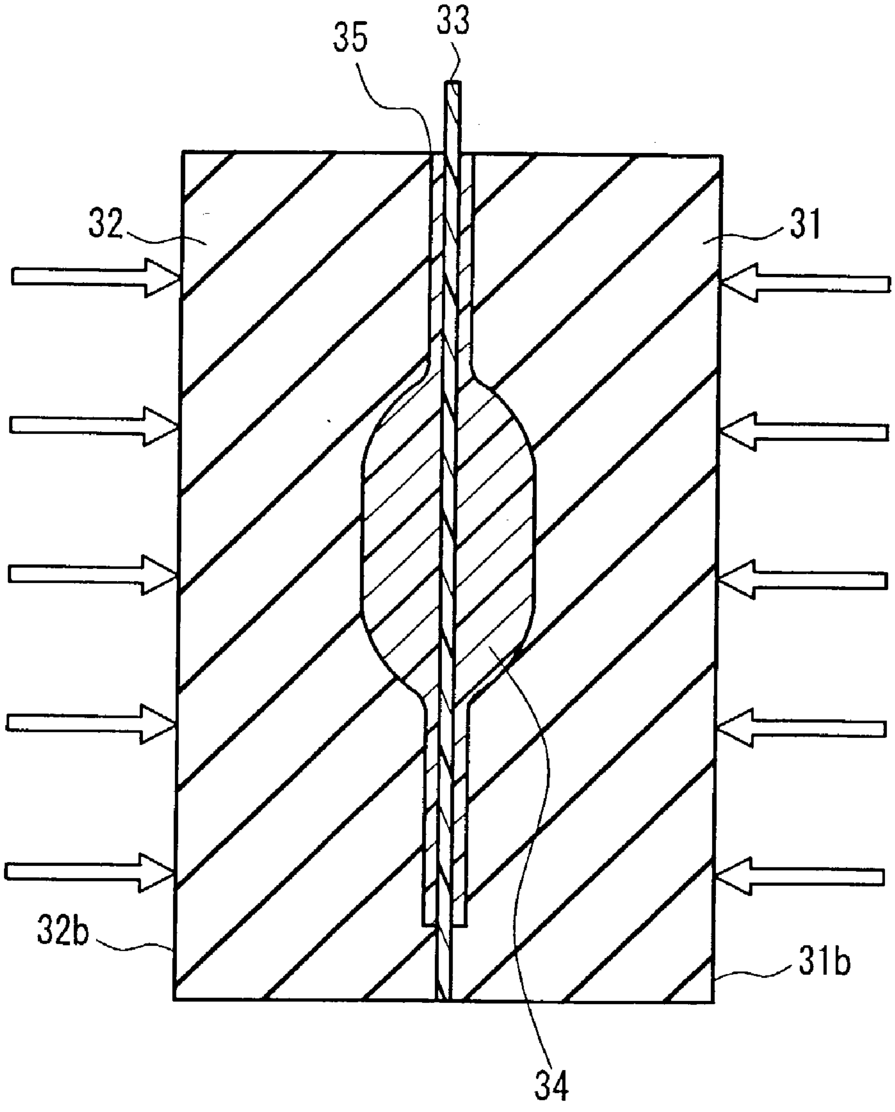
FIG. 16 is a cross-sectional view illustrating another process of the method for manufacturing an arc tube body according to Embodiment 3.
Figure 17:
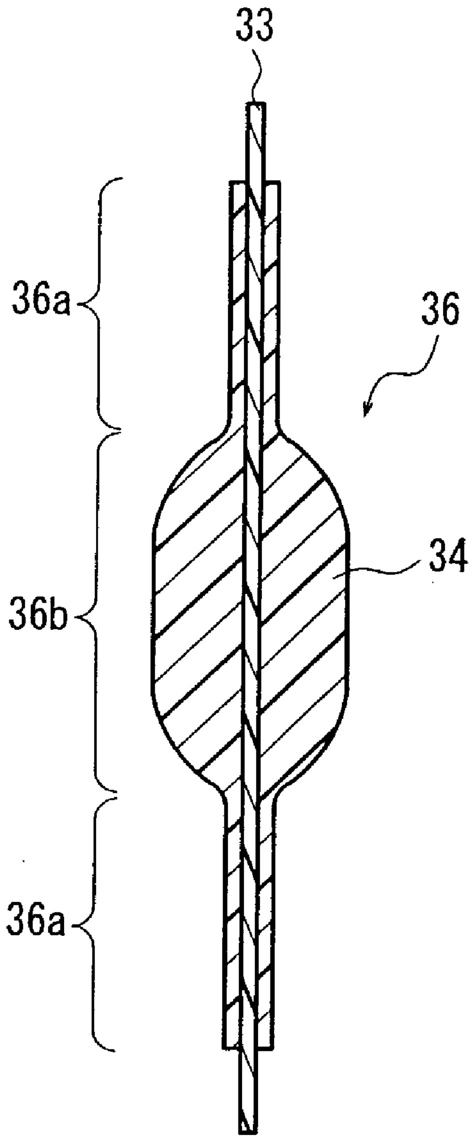
FIG. 17 is a cross-sectional view of a core used in the method for manufacturing an arc tube body according to Embodiment 3.

Hereinafter, a method for manufacturing an arc tube body and a core used in the method according to Embodiment 3 will be described with reference to FIGS. 15 to 17. FIGS. 15 and 16 are cross-sectional views, each illustrating one process of the method for manufacturing an arc tube body according to Embodiment 3. It is to be noted that the processes illustrated from FIG. 15 through FIG. 16 are a series of processes. FIG. 17 is a cross-sectional view of a core used in a method for manufacturing an arc tube body according to Embodiment 3.

First, a core formation mold 31 having a recess 31*a* and a core formation mold 32 having a recess 32*a* are provided. The core formation molds 31 and 32 are bonded to each other, and a shaft 33 is disposed in the hollow space formed by the recesses 31*a* and 32*a*, as shown in FIG. 15. Reference numeral 35 is an inlet through which a material is injected.

In Embodiment 3, the core formation molds 31 and 32 have the same shape as the core formation molds used in the Embodiment 2. However, Embodiment 3 differs from Embodiment 2 in that the core formation molds 31 and 32 are formed of silicone rubber. Embodiment 3 also differs from Embodiment 2 in that a ceramic core wire formed of alumina is used as the shaft 33.

Next, as shown in FIG. 16, the hollow space where the shaft 33 is disposed is filled with a fusible material 34. In Embodiment 3, the fusible material 34 is spray-dry granule powder prepared by mixing carbon power with a butyral resin as a binder. The fusible material 34 is introduced into the hollow space through the inlet 35.

Subsequently, so-called rubber pressing is performed by applying a pressure of 1800 kg/cm$^2$ to the side face 31*b* of the core formation mold 31 and the side face 32*b* of the core formation mold 32 isostatically and hydrostatically. After that, the bonded core formation molds 31 and 32 are separated from each other to obtain a core 36 as shown in FIG. 17. Similarly to the core used in Embodiment 2, the core 36 includes a shaft 33 along its central axis, and not only the main tube formation portion 36*b* but also the thin tube formation portions 36*a* are formed using the fusible material 34.

Thereafter, the thus-obtained core 36 is disposed in arc tube body formation molds; a slurry is injected into the arc tube body formation molds and solidified; the hardened slurry integrated with the core is taken out from the arc tube body formation molds; and the shaft 33 forming the core 36 is removed, in the same manner as that in Embodiment 1 (FIGS. 6 to 8). Then, the hardened slurry is kept at 400° C. for 5 hours in the air so that an organic constituent contained therein is decomposed and evaporated off, after which the hardened slurry further is kept at 600° C. for 10 hours in the air so that carbon is decomposed by heat. Thus, the core 36 completely is removed from the hardened slurry integrated with the core 36 (see FIG. 9).

After that, the hardened slurry from which the core has been removed completely is subjected to pre-firing at 1300° C. for 2 hours in the air, and further to firing at 1900° C. for 2 hours in a hydrogen atmosphere so that the hardened slurry is sintered. Thus, an arc tube body similar to that of Embodiment 1 can be obtained (see FIG. 10). The slurry used in Embodiment 3 is the same as that used in Embodiment 1.

As described above, the method for manufacturing an arc tube body according to Embodiment 3 also is characterized in that a core including a shaft at thin tube formation portions is used, similarly to the method according to Embodiment 1. Therefore, Embodiment 3 can produce the same effects as those described in Embodiment 1. In addition, Embodiment 3 also can produce the same effects as those described in Embodiment 2.

Embodiment 4

Hereinafter, a method for manufacturing an arc tube body and a core used in the method according to Embodiment 4 will be described with reference to FIGS. 18A and 18B to 26A and 26B. FIGS. 18A and 18B to 26A and 26B are cross-sectional views, each illustrating one process of the method for manufacturing an arc tube body according to Embodiment 4. It is to be noted that the processes illustrated from FIGS. 18A and 18B through FIGS. 26A and 26B are a series of processes.

The manufacturing method according to Embodiment 4 includes processes for manufacturing a core according to Embodiment 4. Among FIGS. 18A and 18B to 26A and 26B, FIGS. 18A and 18B to 20A and 20B illustrate a series of processes for manufacturing a core according to Embodiment 4. Further, in FIGS. 18A and 18B to 23A and 23B, FIGS. 18B to 23B are cross-sectional views taken along the cutting plane line (line A–A' to line F–F') of FIGS. 18A to 23B.

In the method for manufacturing an arc tube body according to Embodiment 4, an arc tube body is manufactured by injecting a material into arc tube body formation molds, similarly to the method according to Embodiment 1. However, Embodiment 4 differs from Embodiment 1 in that one of the thin tube portions is designed so as to accommodate two electrodes.

Figure 18A:
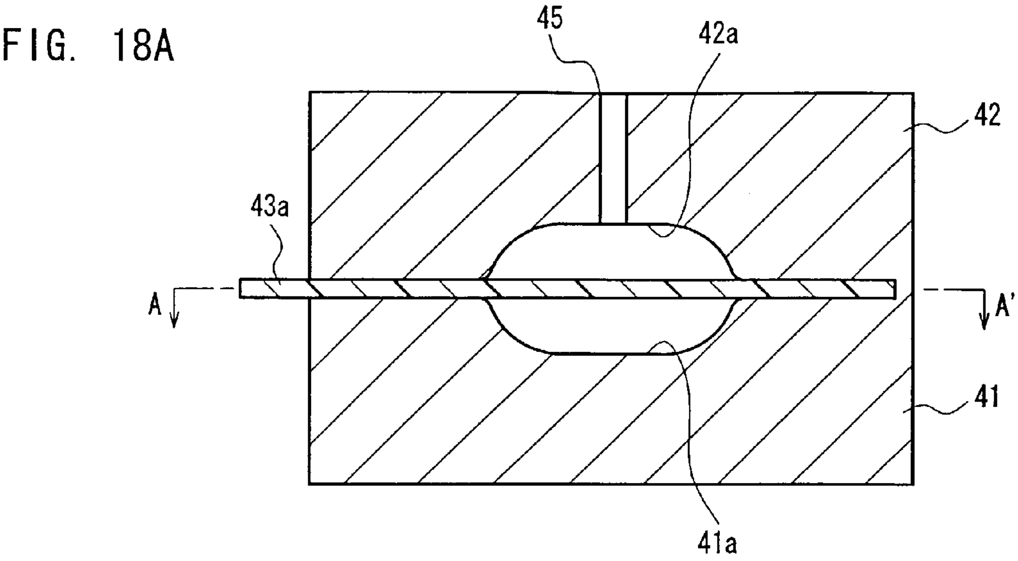
FIG. 18A is a cross-sectional view illustrating one process of a method for manufacturing an arc tube body according to Embodiment 4.
Figure 18B:
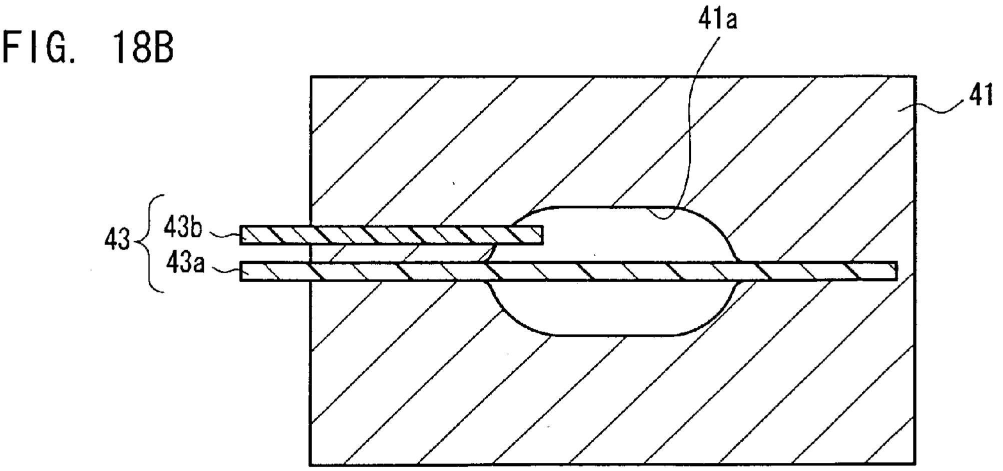
FIG. 18B is a cross-sectional view taken along the cutting plane line A–A' of FIG. 18A.

First, a core formation mold 41 having a recess 41*a* and a core formation mold 42 having a recess 42*a* are provided. The core formation molds 41 and 42 are bonded to each other, and a shaft 43 is disposed in the hollow space formed by the recesses 41*a* and 42*a*, as shown in FIGS. 18A and 18B. Also in Embodiment 4, the recesses 41*a* and 42*a* are formed considering the shrinkage of an arc tube body after firing. Reference numeral 45 is an inlet. In Embodiment 4, the core formation molds 41 and 42 also are formed of stainless steel. However, similarly to Embodiment 1, the material of the core formation molds 41 and 42 is not limited to stainless steel.

Figure 26:
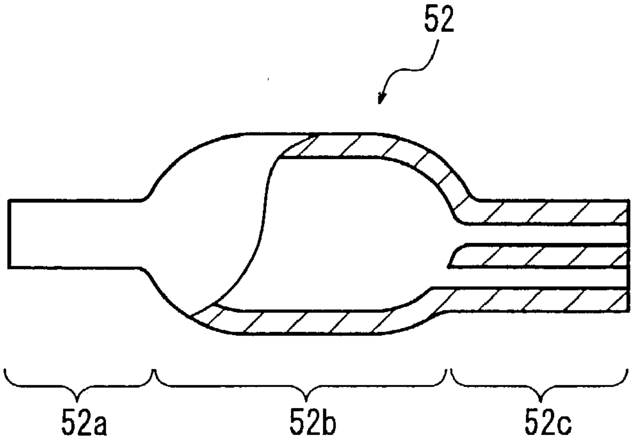
FIG. 26 is a cross-sectional view illustrating another process of the method for manufacturing an arc tube body according to Embodiment 4.

In Embodiment 4, thin tube portions of an arc tube body are designed so as to accommodate three electrodes as shown in FIG. 26, which will be described later. Accordingly, as shown in FIG. 18B, the shaft 43 to be disposed in the hollow space consists of two shafts, i.e., shafts 43*a* and 43*b*. The shaft 43*a* is disposed so that the central axis thereof coincides with the central axis of a core to be formed. On the other hand, the shaft 43*b* is disposed next to the shaft 43*a* so as to be in parallel with the shaft 43*a*. The shafts 43*a* and 43*b* are formed of a resin material as in Embodiment 1. However, the material of the shafts 43*a* and 43*b* is not limited to a resin material.

Figure 19A:
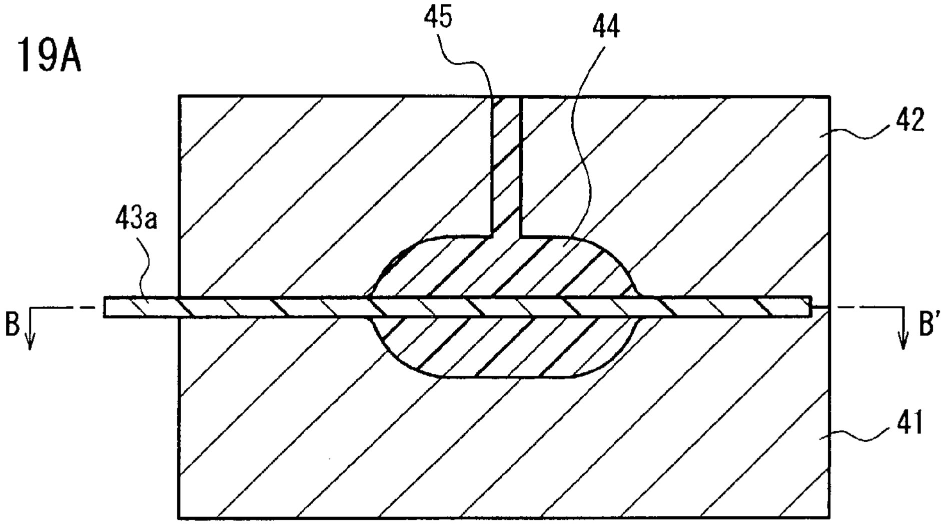
FIG. 19A is a cross-sectional view illustrating another process of the method for manufacturing an arc tube body according to Embodiment 4.
Figure 19B:
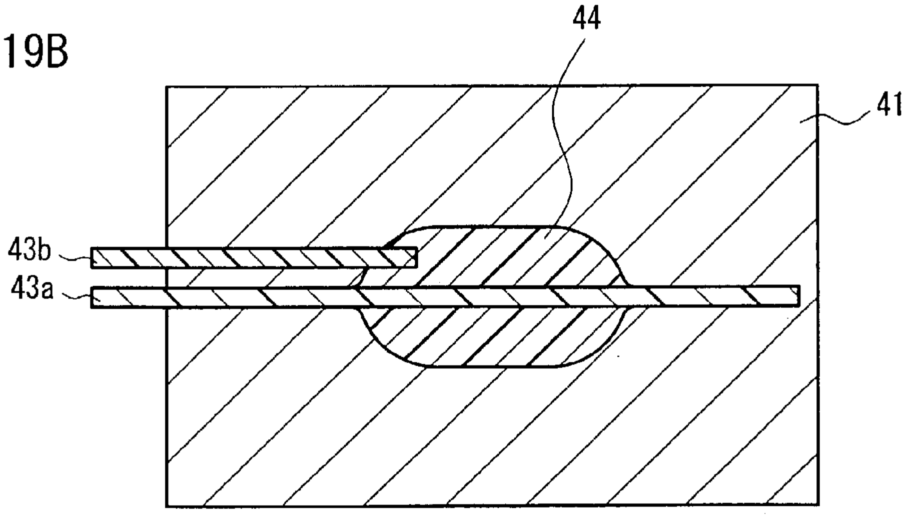
FIG. 19B is a cross-sectional view taken along the cutting plane line B–B' of FIG. 19A.

Next, as shown in FIGS. 19A and 19B, the hollow space where the shafts 43*a* and 43*b* are disposed is filled with a fusible material 44. Also in Embodiment 4, paraffin wax is used as the fusible material 44, and after the injection, the fusible material 44 is left at room temperature until it is solidified, as in Embodiment 1.

Figure 20A:
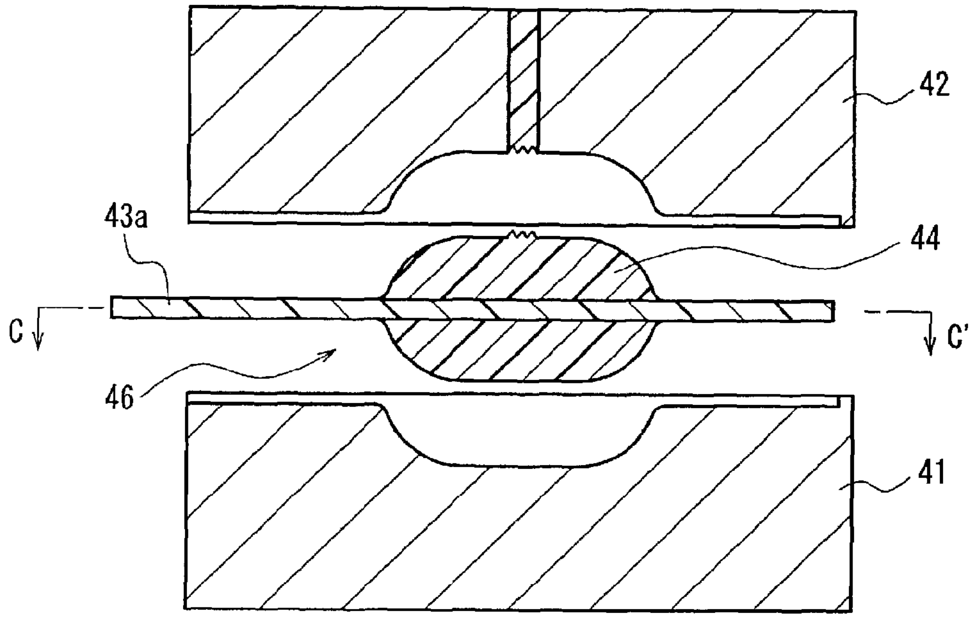
FIG. 20A is a cross-sectional view illustrating another process of the method for manufacturing an arc tube body according to Embodiment 4.
Figure 20B:
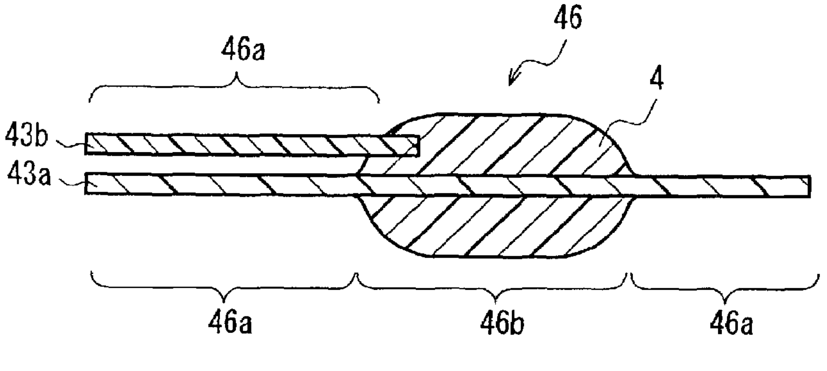
FIG. 20B is a cross-sectional view taken along the cutting plane line C–C' of FIG. 20A.

After that, as shown in FIGS. 20A and 20B, the bonded core formation molds 41 and 42 are separated from each other to obtain a core 46. The core 46 includes three thin tube portions 46*a* and a main tube formation portion 46*b*. Also in Embodiment 4, only the main tube formation portion 46*b* is formed of the fusible material as in Embodiment 1. The thin tube portions 46*a* are formed of the shaft 43*a* or 43*b* only. In Embodiment 4, polishing the core also is required.

Figure 21A:
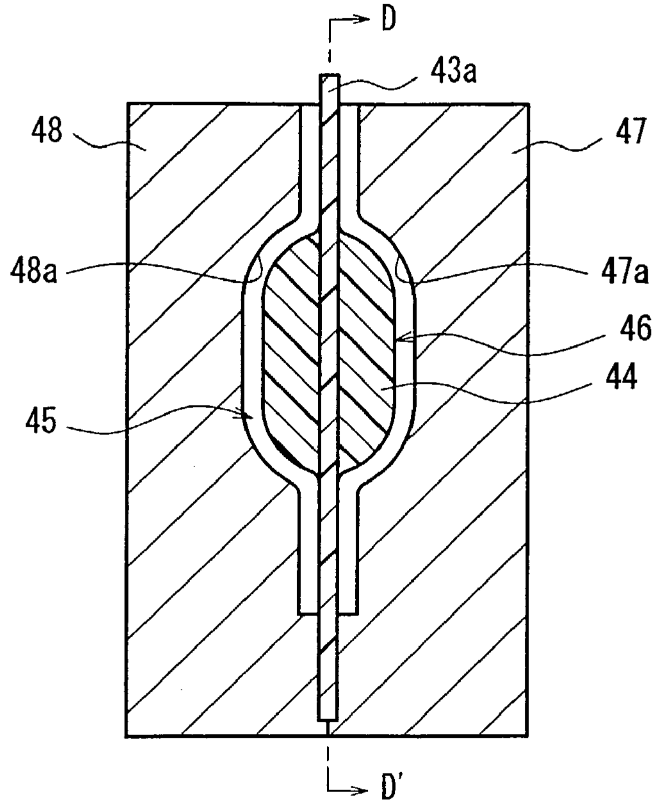
FIG. 21A is a cross-sectional view illustrating another process of the method for manufacturing an arc tube body according to Embodiment 4.
Figure 21B:
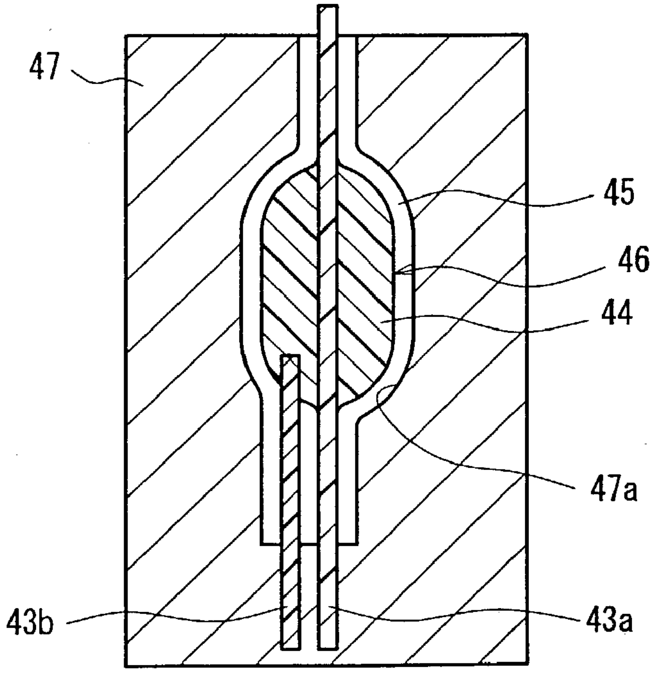
FIG. 21B is a cross-sectional view taken along the cutting plane line D–D' of FIG. 21A.

Subsequently, as shown in FIGS. 21A and 21B, an arc tube body formation mold 47 having a recess 47*a* and an arc tube body formation mold 48 having a recess 48*a* are provided, and the core 46 is disposed in a hollow space formed by the recesses 47*a* and 48*a*. Thus, a space 45 for forming an arc tube body is formed between the respective recesses 47*a*, 48*a* and the core 46. In Embodiment 4, the recesses 47*a* and 48*a* also are formed considering the shrinkage of an arc tube body after firing, and the arc tube body formation molds 47 and 48 also are formed of stainless steel, as in Embodiment 1. Further, Embodiment 4 employs a plate member for positioning and positioning pins as used in Embodiment 1 to improve the accuracy of the position adjustment of the core 46, although they are not shown in the drawing.

Figure 22A:
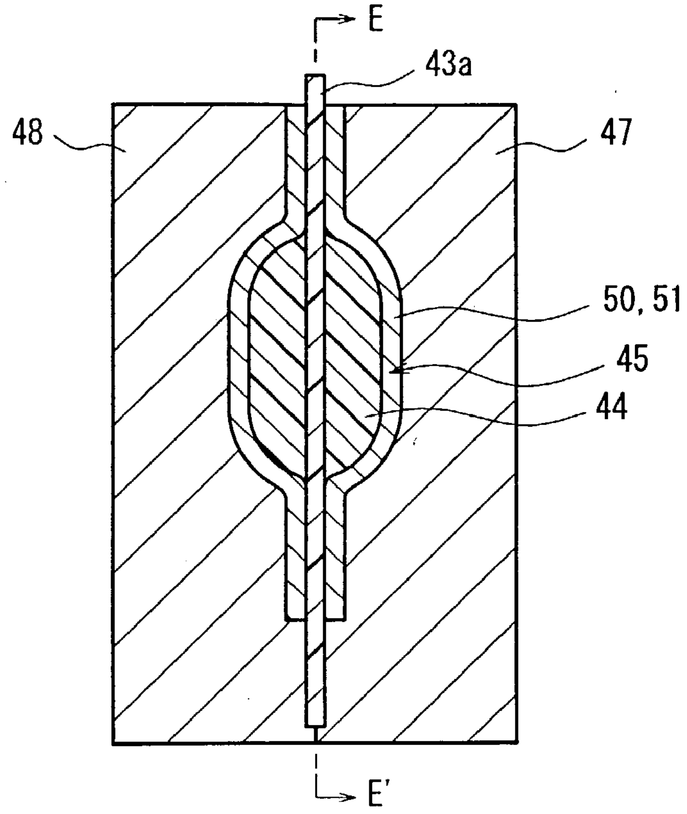
FIG. 22A is a cross-sectional view illustrating another process of the method for manufacturing an arc tube body according to Embodiment 4.
Figure 22B:
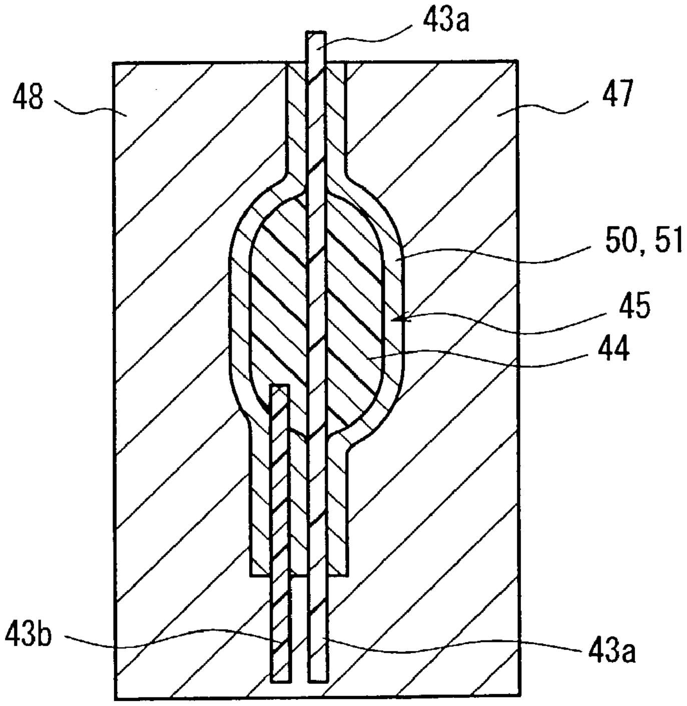
FIG. 22B is a cross-sectional view taken along the cutting plane line E–E' of FIG. 22A.
Figure 23A:
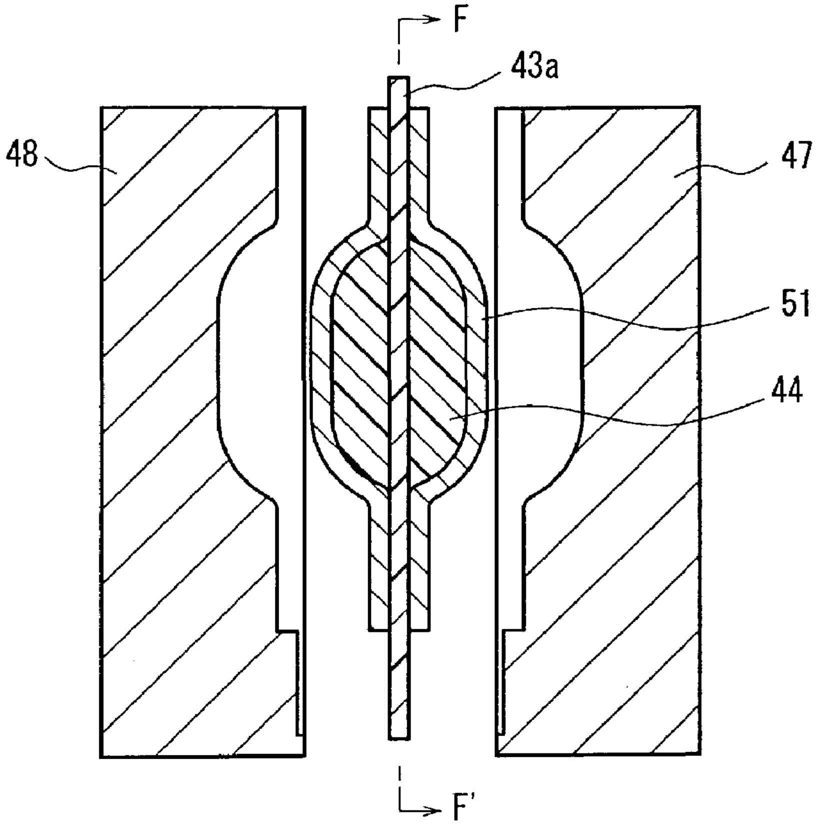
FIG. 23A is a cross-sectional view illustrating another process of the method for manufacturing an arc tube body according to Embodiment 4.
Figure 23B:
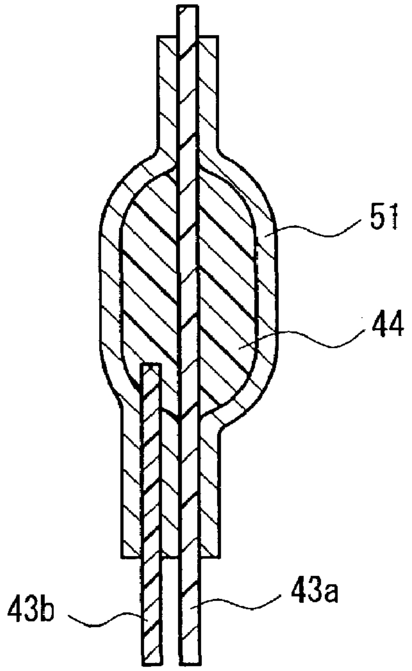
FIG. 23B is a cross-sectional view taken along the cutting plane line F–F' of FIG. 23A.

Next, as shown in FIGS. 22A and 22B, a slurry 50 containing ceramic powder, a solvent, and a hardening agent as main components is injected into the space 45. After the slurry 50 is injected, the arc tube body formation molds 47 and 48 are left at room temperature to form a hardened slurry 51. The slurry 50 is the same slurry as that used in Embodiment 1. Subsequently, as shown in FIGS. 23A and 23B, the arc tube body formation molds 47 and 48 are separated to take out the hardened slurry 51 integrated with the core 46.

Figure 24:
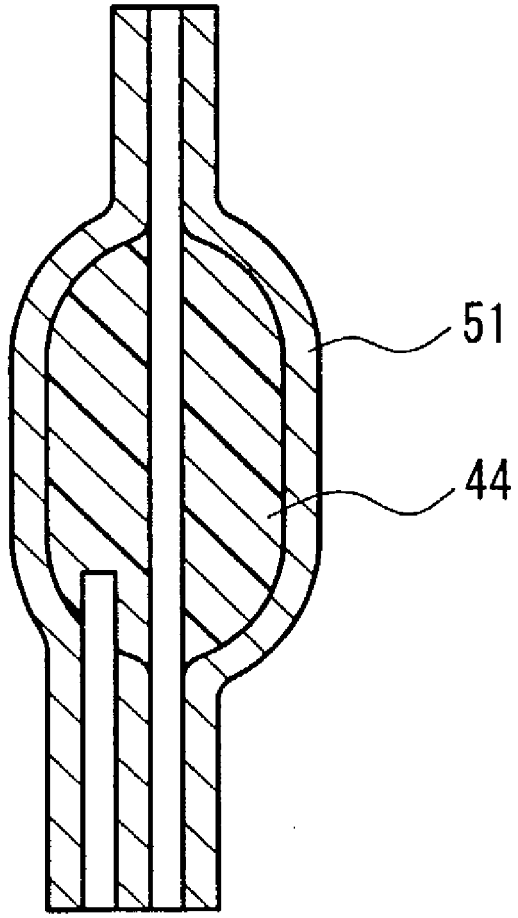
FIG. 24 is a cross-sectional view illustrating another process of the method for manufacturing an arc tube body according to Embodiment 4.

Further, as shown in FIG. 24, the shafts 43*a* and 43*b* are pulled out from the hardened slurry 51 integrated with the core 46. In Embodiment 4, the shafts 43*a* and 43*b* also may be formed of a material that generates heat when a current is applied thereto, e.g., a nichrome wire and the like. When the shafts 43*a* and 43*b* are formed of such a material, it is possible to melt the fusible material 44 by applying a current, which allows the shafts 43*a* and 43*b* to be pulled out easily.

Figure 25:
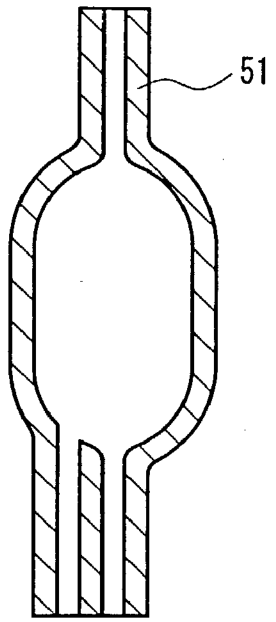
FIG. 25 is a cross-sectional view illustrating another process of the method for manufacturing an arc tube body according to Embodiment 4.

Subsequently, the fusible material 44 remaining inside the hardened slurry 51 is drained from the hardened slurry 51, as shown in FIG. 25. In Embodiment 4, the hardened slurry 51 also is placed in a constant temperature bath to drain the fusible material 44, as in Embodiment 1. Then, an organic constituent contained in the hardened slurry 51, which is hollow after the fusible material 44 has been drained, is decomposed and evaporated off, and the hardened slurry 51 is subjected to pre-firing and further to firing so that the hardened slurry 51 is sintered, in the same manner as that in Embodiment 1. Thus, an arc tube body 52 as shown in FIG. 26 is obtained.

In the arc tube body 52 shown in FIG. 26, reference numerals 52*a* and 52*c* denote thin tube portions for accommodating electrodes, and reference numeral 52*b* denotes a main tube portion to serve as a discharge space. The thin tube portion 52*c* is designed so as to accommodate two electrodes, and can accommodate an auxiliary electrode in addition to a main electrode. The main electrode in the thin tube portion 52*c* and the other main electrode in the thin tube portion 52*a* are disposed so as to face each other on a common straight line.

As described above, the method for manufacturing an arc tube body according to Embodiment 4 also is characterized in that a core including a shaft at thin tube formation portions is used, similarly to the method according to Embodiment 1. Therefore, Embodiment 4 can produce the same effects as those described in Embodiment 1.

Figure 33A:
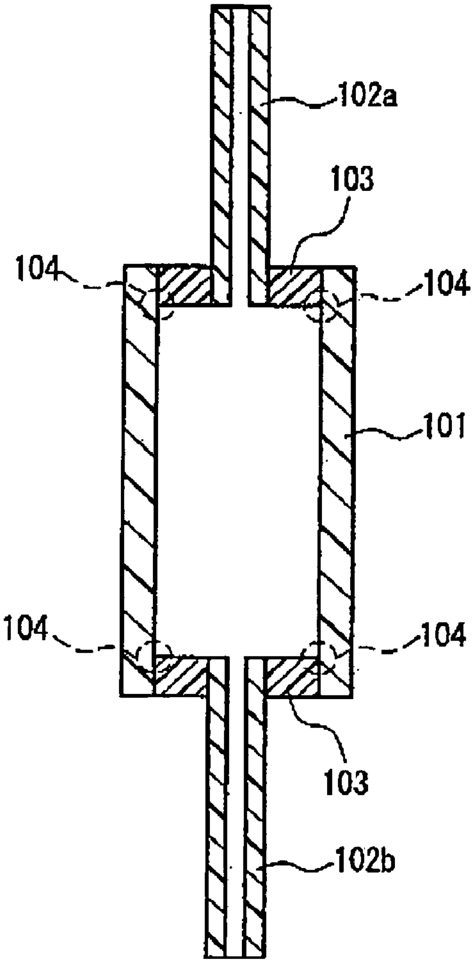
Prior Art FIG. 33A
FIGS. 33A and 33B are cross-sectional views, each showing one example of a conventional arc tube body formed of a ceramic material.
Figure 33B:
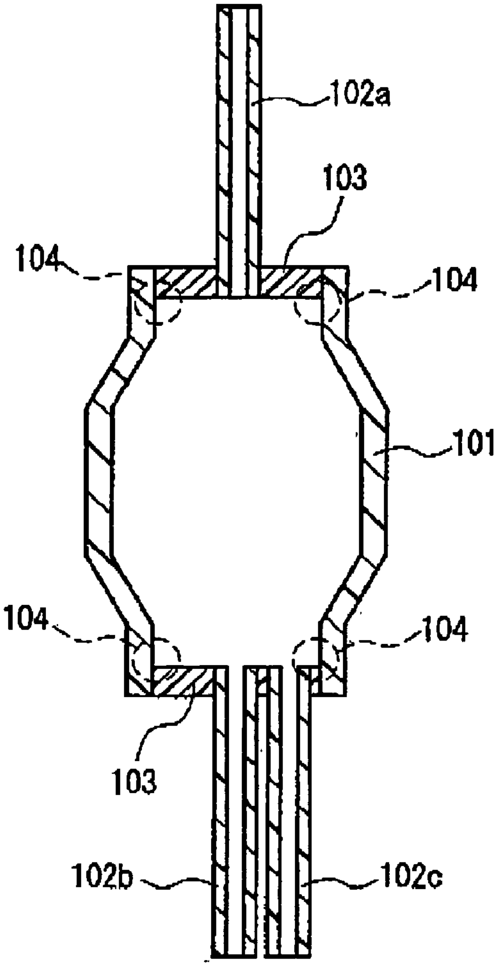
Prior Art FIG. 33B
Figure 34:
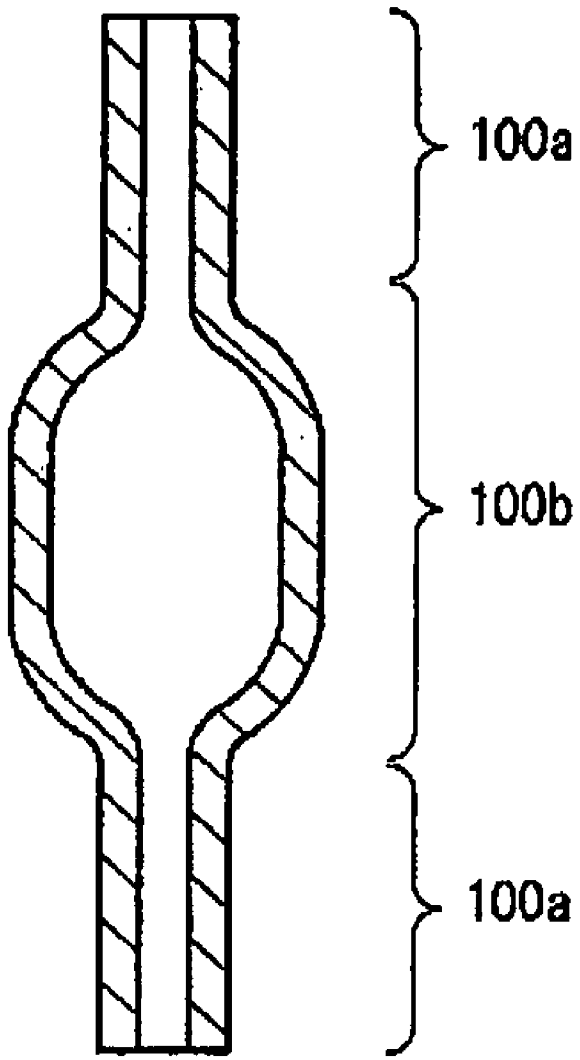
Prior Art FIG. 34
FIG. 34 is a cross-sectional view of an arc tube body formed by conventional slip casting method.
Figure 35:
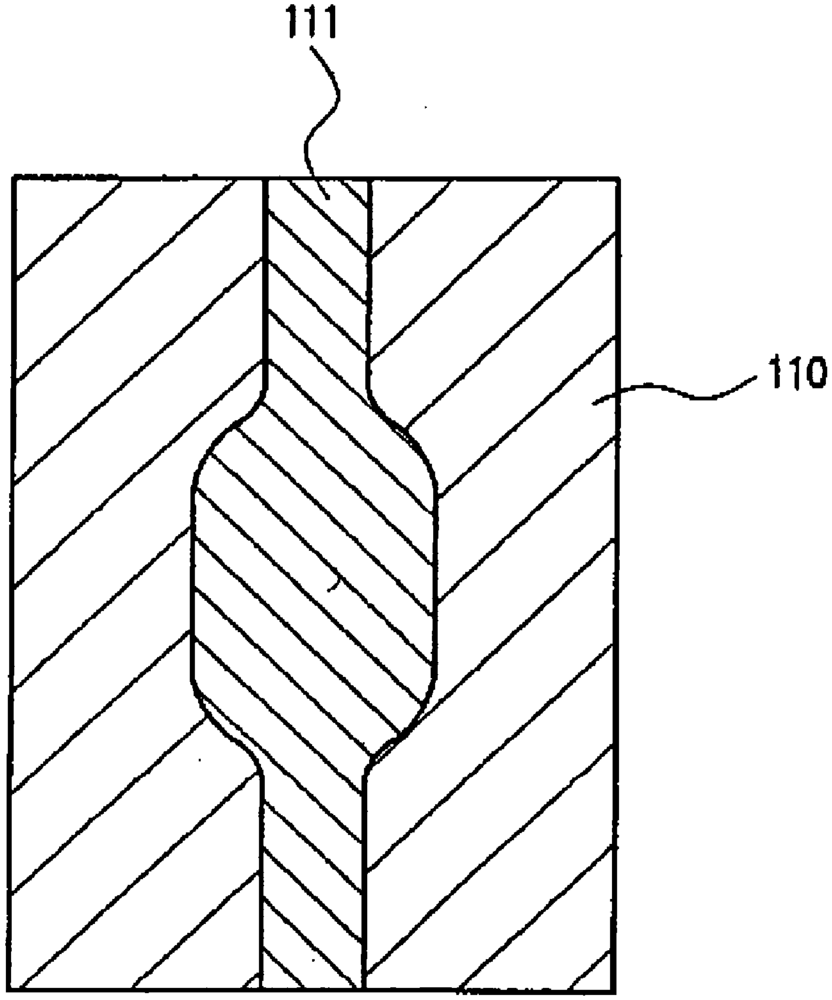
Prior Art FIG. 35
FIG. 35 is a cross-sectional view illustrating one process of conventional slip casting method.
Figure 36:
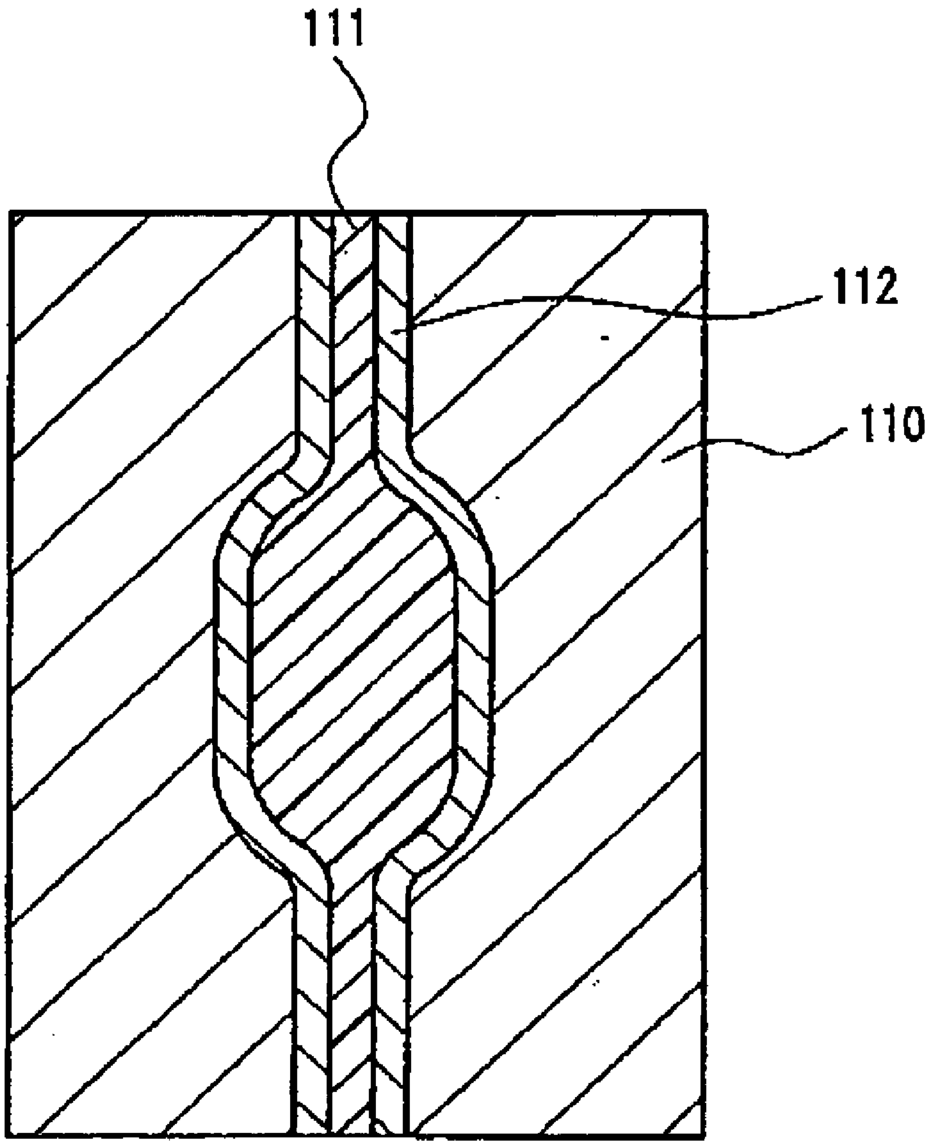
Prior Art FIG. 36
FIG. 36 is a cross-sectional view illustrating another process of conventional slip casting method.
Figure 37:
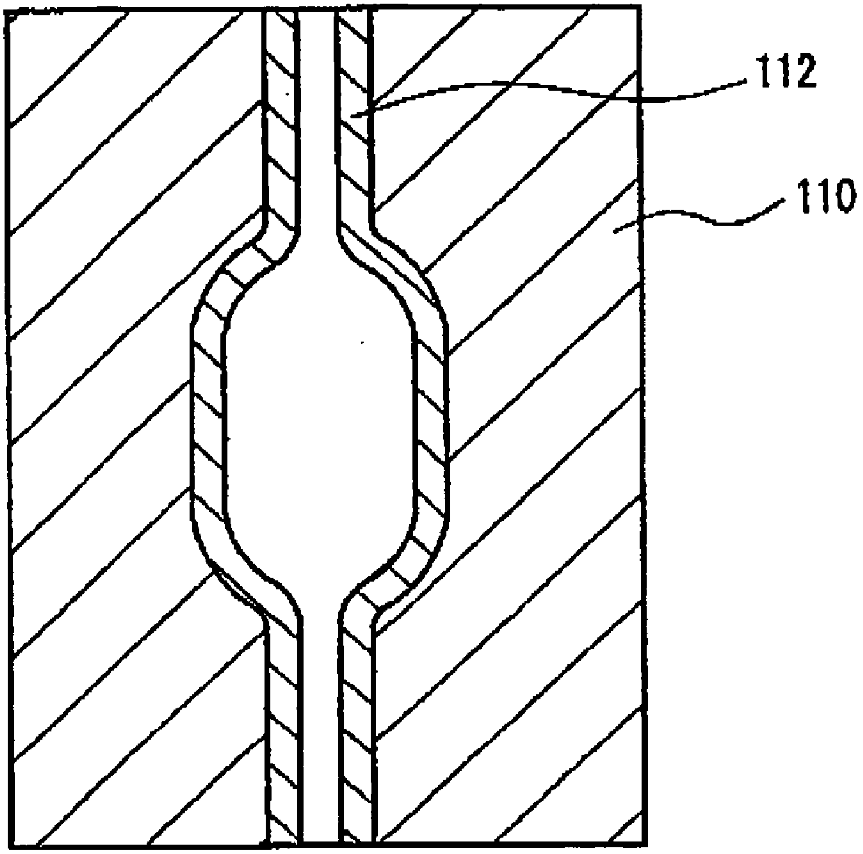
Prior Art FIG. 37
FIG. 37 is a cross-sectional view illustrating another process of the conventional slip casting method.
Figure 38:
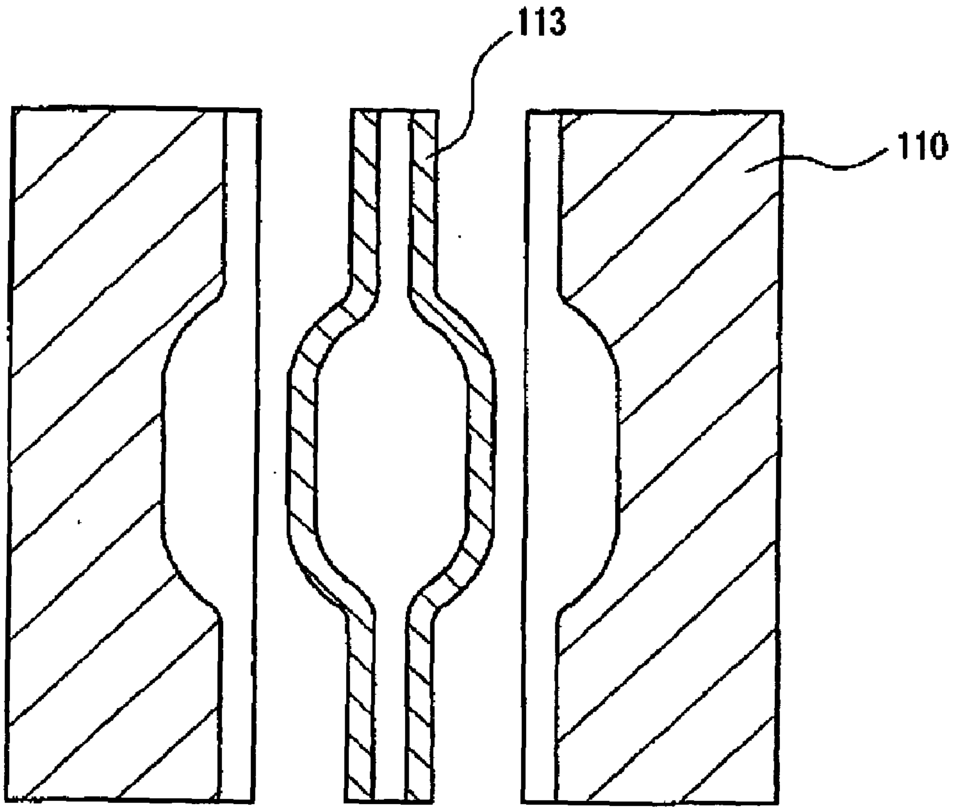
Prior Art FIG. 38
FIG. 38 is a cross-sectional view illustrating another process of the conventional slip casting method.

Furthermore, 100 samples of the arc tube body including thin tube portions capable of accommodating an auxiliary electrode and a main electrode as shown in FIG. 33B were manufactured according to the conventional method by connecting the respective components, and then, 100 samples of a metal vapor discharge lamp were manufactured using these samples to conduct a life test. As a result, it was found that 5 out of 100 samples had cracks in the connecting portions between the respective components.

The same life test was conducted with respect to 100 samples of the arc tube body manufactured according to the method of Embodiment 4. As a result, it was found that none of the sample arc tube bodies had cracks. Thus, it is understood that an arc tube body manufactured by the method according to Embodiment 4 has good quality.

Embodiment 5

Hereinafter, a method for manufacturing an arc tube body and a core used in the method according to Embodiment 5 will be described with reference to FIGS. 27A and 27B to 29A and 29B. FIGS. 27A and 27B to 29A and 29B are cross-sectional views, each illustrating one process of the method for manufacturing an arc tube body according to Embodiment 5. It is to be noted that the processes illustrated from FIGS. 27A and 27B through FIGS. 29A and 29B are a series of processes. Further, in FIGS. 27A and 27B to 29A and 29B, FIGS. 27B to 29B are cross-sectional views taken along the cutting plane line (line G–G' to line I–I') of FIGS. 27A to 29A.

The method of Embodiment 5 is the same as that of Embodiment 4 except that a layer of a fusible material or a combustible material covers a shaft also at thin tube formation portions of a core. An arc tube body manufactured by the method of Embodiment 5 is similar to the arc tube body shown in FIG. 26.

Figure 27A:
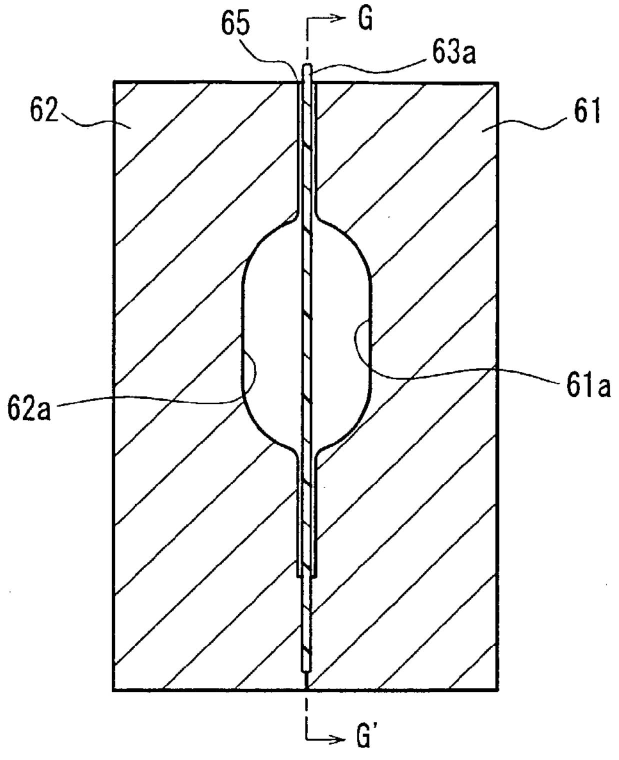
FIG. 27A is a cross-sectional view illustrating one process of a method for manufacturing an arc tube body according to Embodiment 5.
Figure 27B:
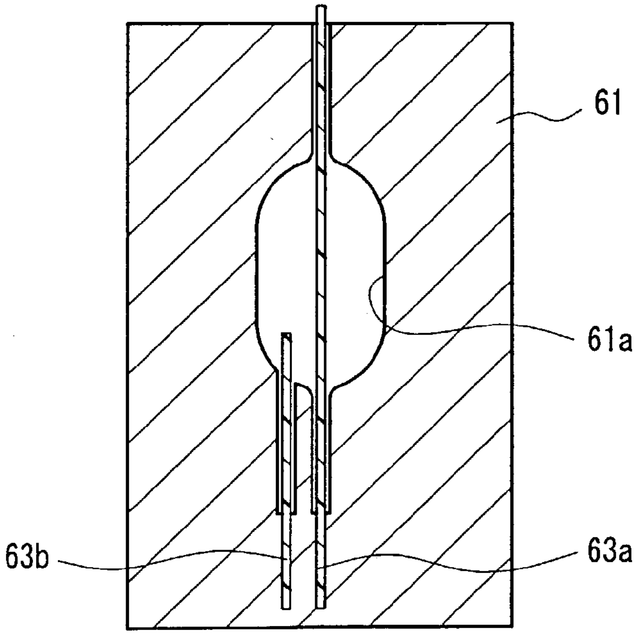
FIG. 27B is a cross-sectional view taken along the cutting plane line G–G' of FIG. 27A.

First, as shown in FIGS. 27A and 27B, a core formation mold 61 having a recess 61*a* and a core formation mold 62 having a recess 62*a* are bonded to each other, and shafts 63*a* and 63*b* are disposed in the hollow space formed by the recesses 61*a* and 62*a*.

Similarly to the core formation molds used in Embodiment 1, the recesses 61*a* and 62*a* are formed considering the shrinkage of an arc tube body after firing. In Embodiment 5, the core formation molds 61 and 62 also are formed of stainless steel. However, as in Embodiment 1, the material of the core formation molds 61 and 62 is not limited to stainless steel. Unlike Embodiment 1, core wires formed of stainless steel are used as shafts 63*a* and 63*b*. Further, unlike Embodiments 1 and 4, the shafts 63*a* and 63*b* are not in contact with the recesses 61*a* and 62*a*.

Figure 28A:
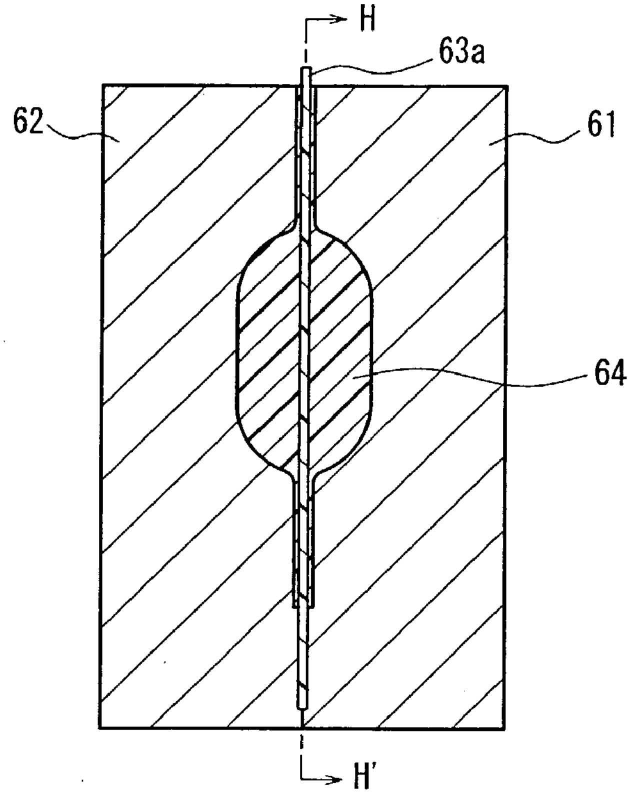
FIG. 28A is a cross-sectional view illustrating another process of the method for manufacturing an arc tube body according to Embodiment 5.
Figure 28B:
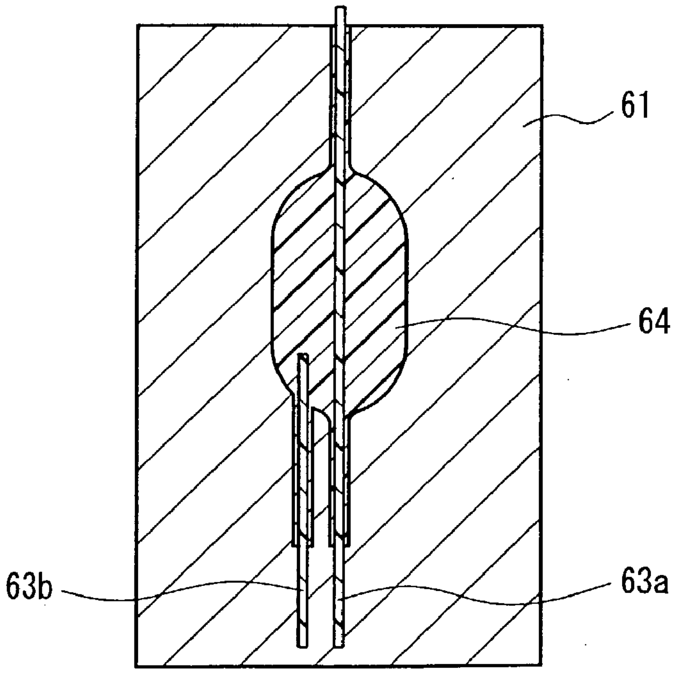
FIG. 28B is a cross-sectional view taken along the cutting plane line H–H' of FIG. 28A.

Next, as shown in FIGS. 28A and 28B, the hollow space where the shafts 63*a* and 63*b* are disposed is filled with a fusible material 64. Also in Embodiment 5, paraffin wax is used as the fusible material 64 as in Embodiment 1. The fusible material 64 is injected into the hollow space through an inlet 65. After the injection, the core formation molds 61 and 62 into which the fusible material 64 is injected are left until they cool down to room temperature so that the fusible material 64 is solidified.

Figure 29A:
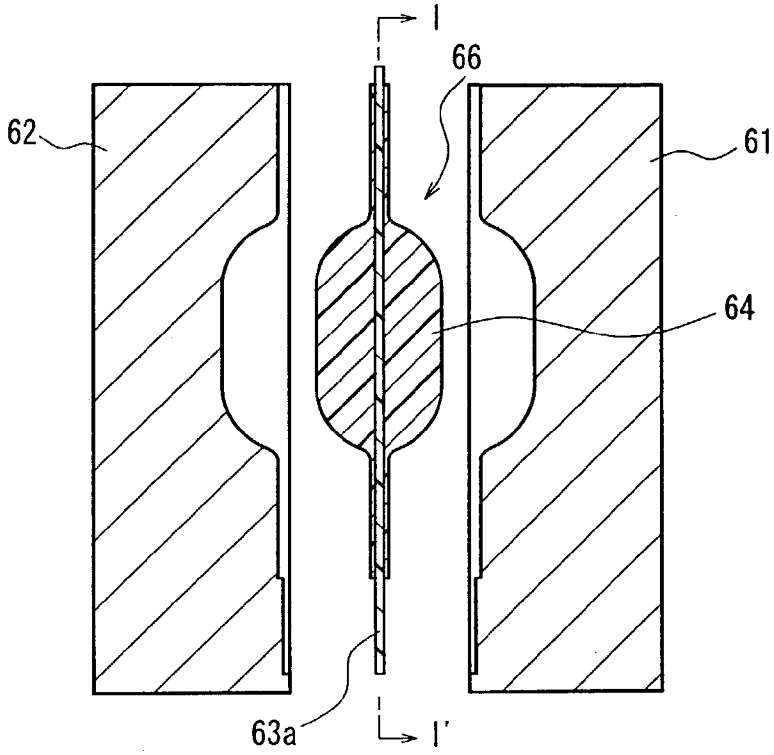
FIG. 29A is a cross-sectional view illustrating another process of the method for manufacturing an arc tube body according to Embodiment 5.
Figure 29B:
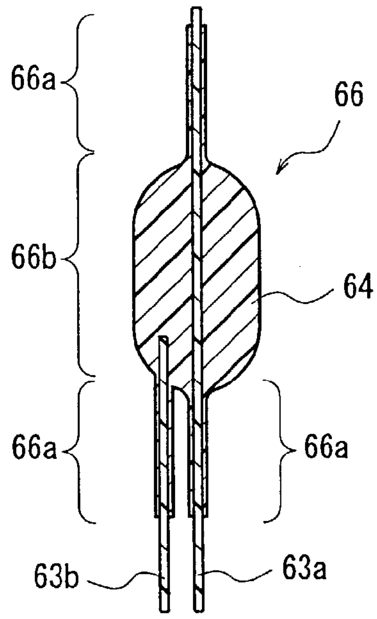
FIG. 29B is a cross-sectional view taken along the cutting plane line I–I' of FIG. 29A.

After that, as shown in FIGS. 29A and 29B, the bonded core formation molds 61 and 62 are separated from each other to obtain a core 66. The core 66 thus obtained includes three thin tube formation portions 66*a* and a main tube formation portion 66*b*, similarly to the core 46 used in Embodiment 4. However, Embodiment 5 differs from Embodiment 4 in that the thin tube formation portions 66*a* also are formed using the fusible material 64.

In Embodiment 5, the inlet 25 is not provided so that the material flows into the main tube formation portion 66*b* as in Embodiment 4. Therefore, the necessity of polishing the core is eliminated in Embodiment 5 as in Embodiment 2. It is to be noted that, in Embodiment 5, the inlet 65 may be provided so that the material flows into the main tube formation portion 66*b* as in Embodiment 4. In this case, it is still possible to obtain the core 66 in which not only the main tube formation portion 66*b* but also the thin tube formation portions 66*a* are formed using the fusible material 64 as shown in FIGS. 29A and 29B.

Thereafter, the thus-obtained core 66 is disposed in arc tube body formation molds; a slurry is injected into the arc tube body formation molds and solidified; the hardened slurry integrated with the core is taken out from the arc tube body formation molds; and the hardened slurry integrated with the core is fired after the core has been removed, in the same manner as that in Embodiment 4 (see FIGS. 21 to 25). Thus, an arc tube body similar to that of Embodiment 4 can be obtained (see FIG. 26). The slurry used in Embodiment 5 is the same as that used in Embodiment 1.

As described above, the method for manufacturing an arc tube body according to Embodiment 5 also is characterized in that a core including a shaft at thin tube formation portions is used, similarly to the method according to Embodiment 1. Therefore, Embodiment 5 can produce the same effects as those described in Embodiment 1. In addition, Embodiment 5 can produce the effects peculiar to Embodiment 2 since the layer of the fusible material covers the shaft also at thin tube formation portions of the core.

Embodiment 6

Figure 30:
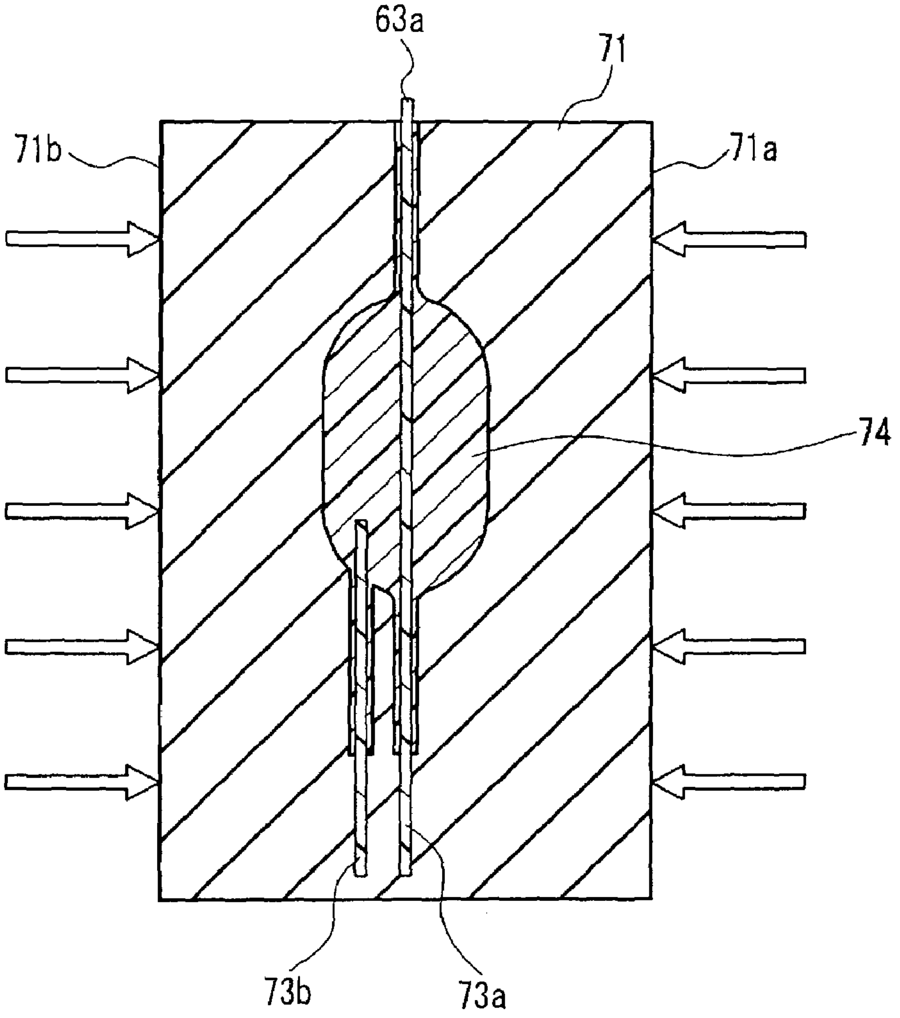
FIG. 30 is a cross-sectional view illustrating one process of a method for manufacturing an arc tube body according to Embodiment 6.

Hereinafter, a method for manufacturing an arc tube body and a core used in the method according to Embodiment 6 will be described with reference to FIG. 30. FIG. 30 is a cross-sectional view illustrating one process of the method for manufacturing an arc tube body according to Embodiment 6. The method of Embodiment 6 is the same as that of Embodiment 5 except that core formation molds are formed of a rubber material.

First, core formation molds 71 (see FIG. 30) having the same shape as the core formation molds shown in FIGS. 27A and 27B of Embodiment 5 are formed using silicone rubber. Then, in the core formation molds 71 formed of silicone rubber, ceramic core wires having the same shape as those shown in FIGS. 27A and 27B are disposed as shafts 73*a* and 73*b* (see FIG. 30).

Next, as shown in FIG. 30, the hollow space formed by the core formation molds 71 where the shafts 73*a* and 73*b* are disposed is filled with the same spray-dry granule powder as that used in Embodiment 3, which is prepared by mixing carbon power with a butyral resin as a binder. It is to be noted here that, although two core formation molds actually are used as the core formation molds 71, only one of them is shown in FIG. 30.

Subsequently, so-called rubber pressing is performed by applying a pressure of 1800 $kg/cm^2$ to the side faces 71*a* and 71*b* of the core formation molds 71 isostatically and hydrostatically. Thereafter, the core formation molds 71 are separated from each other to obtain a core having the same shape as the core shown in FIG. 26 of Embodiment 5.

Thereafter, the thus-obtained core is disposed in arc tube body formation molds; a slurry is injected into the arc tube body formation molds and solidified; and the hardened slurry integrated with the core is taken out from the arc tube body formation molds, in the same manner as that in Embodiment 5. Subsequently, removal of the shafts, decomposition of carbon, and firing of the hardened slurry are performed in the same manner as that in Embodiment 3. Thus, an arc tube body similar to that of Embodiment 5 can be obtained (see FIG. 26). The slurry used in Embodiment 6 is the same as that used in Embodiment 1.

As described above, the method for manufacturing an arc tube body according to Embodiment 6 also is characterized in that a core including a shaft at thin tube formation portions is used, similarly to the method according to Embodiment 1. Therefore, Embodiment 6 can produce the same effects as those described in Embodiment 1.

Embodiment 7

Figure 31A:
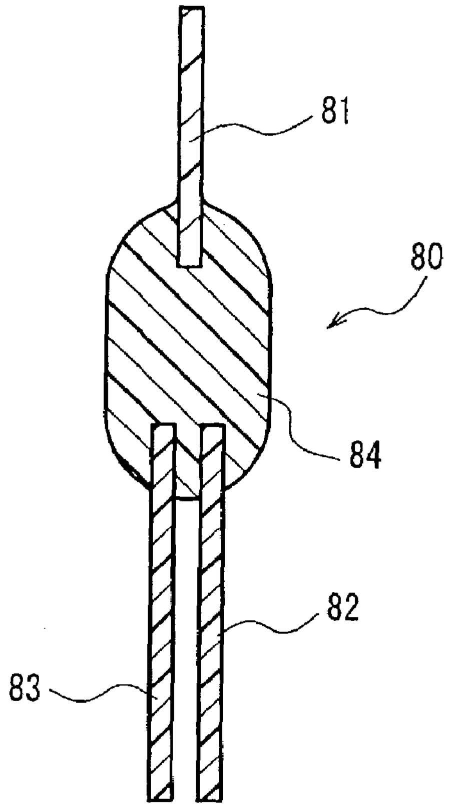
FIG. 31A is a view of a core used in the method for manufacturing an arc tube body according to Embodiment 7.

Hereinafter, a method for manufacturing an arc tube body and a core used in the method according to Embodiment 7 will be described with reference to FIG. 31. FIG. 31A is a view of a core used in a method for manufacturing an arc tube body according to Embodiment 7, and FIG. 31B is a view of an arc tube body manufactured by the method for manufacturing an arc tube body according to Embodiment 7.

As shown in FIG. 31A, in Embodiment 7, a core 80 is provided with three shafts, i.e., shafts 81, 82, and 83, and thin tube formation portions are formed of these three shafts 81, 82, and 83. The shaft 81 is not disposed so as to be on a common straight line with the shaft 82 or 83.

Figure 31B:
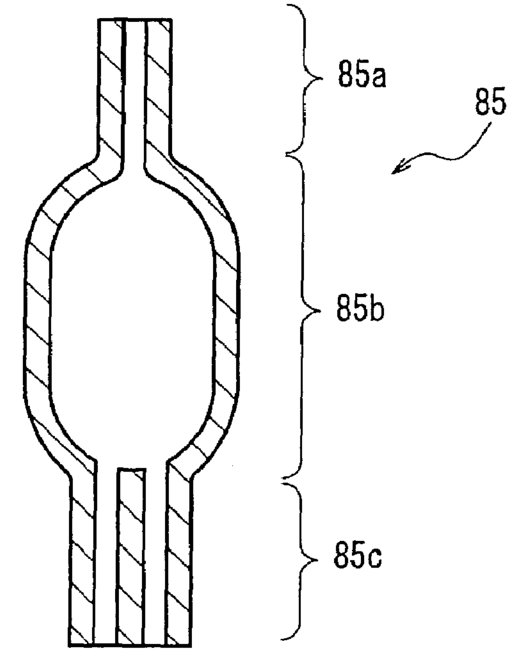
FIG. 31B is a view of an arc tube body manufactured by the method for manufacturing an arc tube body according to Embodiment 7.

Therefore, by conducting the injection of a slurry and the firing in the same manner as that in Embodiment 4 using the core 80, an arc tube body 85 as shown in FIG. 31B is obtained. In FIG. 31B, reference numerals 85*a* and 85*c* denote thin tube portions, and reference numeral 85*b* denotes a main tube portion. The thin tube portion 85*c* is designed so as to accommodate two electrodes, and can accommodate an auxiliary electrode in addition to a main electrode. Unlike the arc tube body shown in FIG. 26, in the arc tube body 85 manufactured using the core 80, the main electrode in the thin tube portion 85*a* and the other main electrode in the thin tube portion 85*c* are not disposed so as to face each other on a common straight line.

Embodiment 8

Figure 32A:
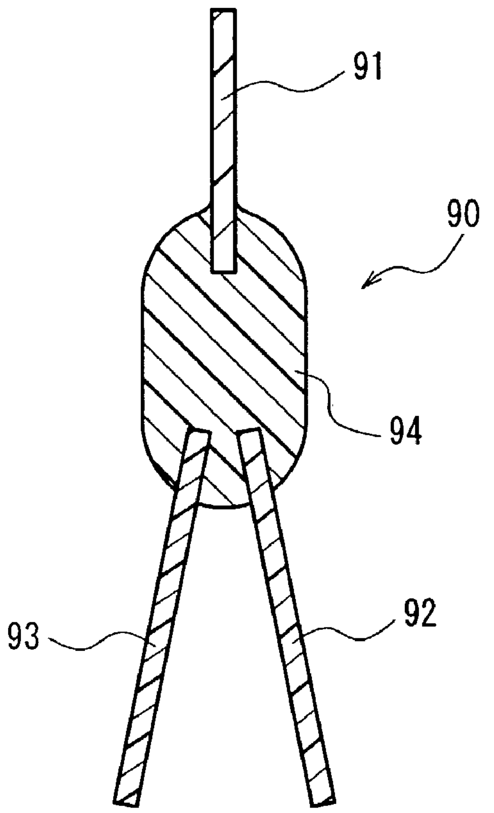
FIG. 32A is a view of a core used in a method for manufacturing an arc tube body according to Embodiment 8.

Hereinafter, a method for manufacturing an arc tube body and a core used in the method according to Embodiment 8 will be described with reference to FIG. 32. FIG. 32A is a view of a core used in a method for manufacturing an arc tube body according to Embodiment 8, and FIG. 32B is a view of an arc tube body manufactured by the method for manufacturing an arc tube body according to Embodiment 8.

As shown in FIG. 32A, in Embodiment 8, a core 90 also is provided with three shafts, i.e., shafts 91, 92, and 93, and thin tube formation portions are formed of these three shafts 91, 92, and 93, as in Embodiment 7. The shaft 91 is not disposed so as to be on a common straight line with the shaft 92 or 93. Embodiment 8 differs from Embodiment 7 in that the shafts are not in parallel with each other.

Figure 32B:
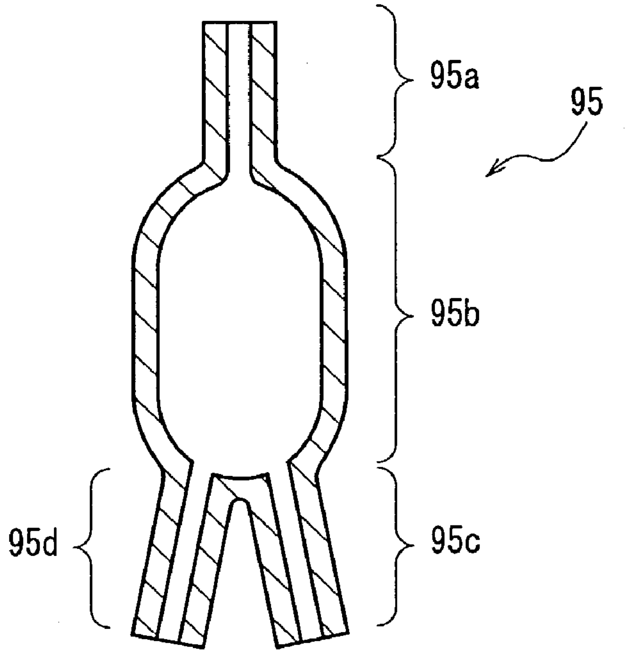
FIG. 32B is a view of an arc tube body manufactured by the method for manufacturing an arc tube body according to Embodiment 8.

Therefore, by conducting the injection of a slurry and the firing in the same manner as that in Embodiment 4 using the core 90, an arc tube body 95 as shown in FIG. 32B is obtained. In the arc tube body 95, the thin tube portions 95*a*, 95*c*, and 95*d* are not in parallel with each other. The thin tube portions 95*a* and 95*c* accommodates main electrodes while the thin tube portions 95*d* accommodates an auxiliary electrode.

INDUSTRIAL APPLICABILITY

As specifically described above, a method for manufacturing a arc tube body according to the present invention and a core according to the present invention can reduce the chances that thin tube formation portions of the core and thin tube portions of the arc tube body might be broken and thus can improve the productivity of an arc tube body. Further, the dimensional accuracy of the thin tube portions of the arc tube body also can be improved. Furthermore, the degree of freedom in the design of the internal shape of the thin tube portions of the arc tube body also can be increased, and the necessity of mechanical processing required when changing the thickness of the arc tube body in conventional methods is eliminated, resulting in cost saving.

The invention claimed is:

1. A method for manufacturing an arc tube body, which comprises a main tube portion to be a discharge space and thin tube portions for accommodating electrodes, using a pair of molds and a material to be injected thereinto, comprising at least:

disposing a core in a hollow space formed by the molds before injecting the material, the core comprising portions for forming an internal shape of the thin tube portions, a portion for forming an internal shape of the main tube portion, and a shaft disposed in the portions for forming an internal shape of the thin tube portions;

injecting the material into a space between the molds and the core, the material being a slurry containing ceramic powder, a solvent, and a hardening agent as main components;

forming a hardened slurry by solidifying the slurry injected into the hollow space where the core is disposed;

taking out the hardened slurry integrated with the core from the molds and separating the hardened slurry and the core; and firing the hardened slurry from which the core has been separated.

2. The method for manufacturing an arc tube body according to claim 1, wherein the molds are formed of a metallic material, a resin material, or a ceramic material.

3. The method for manufacturing an arc tube body according to claim 1 further comprising:

disposing the shaft in a hollow space formed by a pair of core formation molds and filling the hollow space with a fusible material or a combustible material so that at least a portion of the core for forming an internal shape of the main tube portion of the arc tube body is formed of the fusible material or the combustible material.

4. The method for manufacturing an arc tube body according to claim 1, wherein the core comprises two portions for forming an internal shape of the thin tube portions, one of the two portions facing the other portion with the portion for forming the main tube portion intervening therebetween, and a shaft present at one of the two portions and a shaft present at the other portion are defined by one common shaft.

5. The method for manufacturing an arc tube body according to claim 1, wherein the core comprises at least two shafts.

6. The method for manufacturing an arc tube body according to claim 1, wherein a layer of a fusible material or a combustible material is formed around the shaft.

7. The method for manufacturing an arc tube body according to claim 1, wherein the shaft is formed of a metallic material, a resin material, or a ceramic material.

8. The method for manufacturing an arc tube body according to claim 3, wherein the shaft is formed of a material that generates heat when an electric current is applied thereto so that heat generated from the shaft melts a portion formed of the fusible material of the core, thereby allowing the hardened slurry and the core to be separated from each other.

* * * * *